United States Patent
Faccin et al.

(10) Patent No.: US 10,880,806 B2
(45) Date of Patent: *Dec. 29, 2020

(54) ENABLE A NETWORK-TRIGGER CHANGE OF NETWORK SLICES

(71) Applicant: QUALCOMM Incorporated, San Diego, CA (US)

(72) Inventors: Stefano Faccin, San Ysidro, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,425

(22) Filed: Apr. 11, 2019

(65) Prior Publication Data
US 2019/0239136 A1 Aug. 1, 2019

Related U.S. Application Data

(63) Continuation of application No. 15/963,654, filed on Apr. 26, 2018, now Pat. No. 10,264,506.
(Continued)

(51) Int. Cl.
*H04W 36/00* (2009.01)
*H04W 36/38* (2009.01)
(Continued)

(52) U.S. Cl.
CPC ........... *H04W 36/385* (2013.01); *H04W 8/12* (2013.01); *H04W 36/0033* (2013.01);
(Continued)

(58) Field of Classification Search
CPC ........... H04W 36/385; H04W 36/0033; H04W 36/06; H04W 60/04; H04W 8/12;
(Continued)

(56) References Cited

U.S. PATENT DOCUMENTS

| 10,264,506 B2 * | 4/2019 | Faccin | H04W 36/385 |
| 2014/0086177 A1 * | 3/2014 | Adjakple | H04W 12/08 |
| | | | 370/329 |

(Continued)

FOREIGN PATENT DOCUMENTS

| CA | 3057401 A1 * | 9/2018 | ............ H04W 12/06 |
| EP | 3358887 A1 * | 8/2018 | .............. H04W 8/12 |

(Continued)

OTHER PUBLICATIONS

Samsung: "Single Value of NSSAI in RRC for CCNF (AMF) Selection," 3GPP Draft; S2-171153 Single Value of NSSAI in RRC for CCNF (AMF) Selection, 3rd Generation Partnership Project (3GPP), Mobile Competence Centre; 650, Route Des Lucioles; F-06921 Sophia-Antipolis Ced, vol. SA WG2, No. Dubrovnik, Croatia; Feb. 13, 2017-Feb. 17, 2017, Feb. 7, 2017 (Feb. 7, 2017), XP051228409, 3 pages, Retrieved from the Internet: URL: http://www.3gpp.org/ftp/tsg_sa/WG2_Arch/TSGS2_119_Dubrovnik/Docs/ [retrieved on Feb. 7, 2017].

(Continued)

*Primary Examiner* — Mahendra R Patel
(74) *Attorney, Agent, or Firm* — Holland & Hart LLP

(57) ABSTRACT

Methods, systems, and devices for wireless communication are described. A method may include determining to modify current-allowed network slices used by a user equipment (UE) based on a network-trigger; identifying new-allowed network slices for the UE based on the determining; selecting a target access and mobility management function (AMF) based on the new-allowed network slices, the target AMF is accessible by the source AMF; and triggering an AMF relocation based on the selecting.

32 Claims, 20 Drawing Sheets

US 10,880,806 B2
Page 2

Related U.S. Application Data

(60) Provisional application No. 62/505,904, filed on May 13, 2017.

(51) Int. Cl.
*H04W 36/06* (2009.01)
*H04W 8/12* (2009.01)
*H04W 36/14* (2009.01)
*H04W 60/04* (2009.01)
*H04W 8/06* (2009.01)

(52) U.S. Cl.
CPC .......... *H04W 36/06* (2013.01); *H04W 36/14* (2013.01); *H04W 8/065* (2013.01); *H04W 60/04* (2013.01)

(58) Field of Classification Search
CPC ....... H04W 4/70; H04W 4/005; H04W 36/14; H04W 36/22; H04W 8/065; H04W 40/32; H04W 40/248; H04L 41/0806; H04L 45/02; H04L 41/00; H04L 41/5041; H04L 41/12
USPC ........................................... 455/439; 370/329
See application file for complete search history.

(56) References Cited

U.S. PATENT DOCUMENTS

| | | | | |
|---|---|---|---|---|
| 2016/0156513 | A1* | 6/2016 | Zhang | H04W 4/70 709/220 |
| 2017/0086118 | A1* | 3/2017 | Vrzic | H04W 36/26 |
| 2017/0303259 | A1* | 10/2017 | Lee | H04W 72/048 |
| 2017/0332421 | A1 | 11/2017 | Sternberg et al. | |
| 2018/0088201 | A1* | 3/2018 | Fujio | G01S 3/48 |
| 2018/0227871 | A1* | 8/2018 | Singh | H04W 60/00 |
| 2018/0227873 | A1* | 8/2018 | Vrzic | H04W 76/27 |
| 2018/0227978 | A1* | 8/2018 | Keller | H04W 4/14 |
| 2018/0270744 | A1* | 9/2018 | Griot | H04W 4/00 |
| 2018/0324577 | A1 | 11/2018 | Faccin et al. | |
| 2018/0332523 | A1 | 11/2018 | Faccin et al. | |
| 2019/0037636 | A1* | 1/2019 | Kim | H04W 84/045 |
| 2019/0124508 | A1* | 4/2019 | Watfa | H04L 63/0876 |
| 2019/0261233 | A1 | 8/2019 | Duan et al. | |
| 2019/0357130 | A1* | 11/2019 | Garcia Azorero | H04W 48/18 |
| 2020/0008047 | A1* | 1/2020 | Castellanos Zamora | H04W 60/04 |

FOREIGN PATENT DOCUMENTS

| | | | |
|---|---|---|---|
| KR | 20170119296 A | 10/2017 | |
| WO | WO2017044153 A1 | 3/2017 | |
| WO | WO-2017044153 A1 * | 3/2017 | |
| WO | WO2017058067 A1 | 4/2017 | |
| WO | WO-2017096606 A1 * | 6/2017 | H04W 72/04 |
| WO | WO2017096606 A1 | 6/2017 | |
| WO | WO2017098441 A1 | 6/2017 | |
| WO | WO-2017098441 A1 * | 6/2017 | |
| WO | WO-2018121880 A1 * | 7/2018 | |
| WO | WO2018121880 A1 | 7/2018 | |
| WO | WO2018034924 A1 | 8/2018 | |
| WO | WO-2018145727 A1 * | 8/2018 | H04W 48/18 |
| WO | WO-2018202274 A1 * | 11/2018 | H04W 8/06 |
| WO | WO-2018205147 A1 * | 11/2018 | H04W 48/18 |

OTHER PUBLICATIONS

Ericsson: "Slice and AMF Selection at HO Procedure," 3GPP Draft, S2-178552 Handover and Slicing, 3rd Generation Partnership-Project (3GPP), Mobile Competence Centre, 650, Route Des Lucioles, F-06921 Sophia-Antipolis Cedex, France, vol. SA WG2, No. Reno, Nevada, USA, Nov. 27, 2017-Dec. 1, 2017, Nov. 21, 2017 (Nov. 21, 2017), XP051379564, pp. 1-24, Retrieved from the Internet: URL:http://www.3gpp.org/tsg_sa/WG2_Arch/TSGS2_124_Reno/Docs/S2-178552_Handover_and_slicing.docx.

Huawei et al., "TS23.502 NF Services Supported by AMF Discussion," 3GPP Draft, S2-172232, 3rd Generation Partnership Project (3GPP), Mobile Competence Centre, 650, Route Des Lucioles, F-06921 Sophia Antipolis Cedex, France, vol. SA WG2, No. Busan, Korea, Mar. 27, 2017-Mar. 31, 2017, Mar. 26, 2017 (Mar. 26, 2017), XP051247958, pp. 1-7, Retrieved from the Internet: URL:http://www.3gpp.org/ftp/Meetings_3GPP_SYNC/SA2/Docs/ [retrieved on Mar. 26, 2017].

Interdigital et al., "Modification of the Set of Selected Slices for a UE," 3GPP Draft, S2-164968, 3rd Generation Partnership Project (3GPP), Mobile Competence Centre, 650, Route Des Lucioles, F-06921 Sophia Antipolis Cedex, France, vol. SA WG2, No. Sanya, China, Aug. 29, 2016-Sep. 2, 2016, Sep. 3, 2016 (Sep. 3, 2016), XP051169023, pp. 1-5, Retrieved from the Internet: URL:http://www.3gpp.org/ftp/tsg_sa/WG2_Arch/TSGS2_116BIS_Sanya/Docs/ [retrieved on Sep. 3, 2016].

International Search Report and Written Opinion—PCT/US2018/029932—ISA/EPO—dated Jun. 29, 2018.

LG Electronics et al., "TS 23.501: Network Triggered Network Slice Change," 3GPP Draft, S2-173243, 3rd Generation Partnership Project (3GPP), Mobile Competence Centre, 650, Route Des Lucioles, F-06921, Sophia Antipolis Cedex, France, vol. SA WG2, No. Hangzhou, May 15, 2017-May 19, 2017, May 9, 2017 (May 9, 2017), XP051268699, pp. 1-4, Retrieved from the Internet: URL:http://www.3gpp.org/ftp/tsg_sa/WG2_Arch/TSGS2_121_Hangzhou/Docs/ [retrieved on May 9, 2017].

Qualcomm Incorporated: "TS 23.502: Completion of Network Triggered Slice Change text," 3GPP Draft, S2-179430_WAS9350_8696_23 502 NW Triggered Slice Change, 3rd Generation Partnership Project (3GPP), Mobile Competence Centre, 650, Route Des Lucioles, F-06921 Sophia-Antipolis Cedex, F, vol. SA WG2, No. Reno, Nevada, USA, Nov. 27, 2017-Dec. 1, 2017, Dec. 1, 2017 (Dec. 1, 2017), XP051365957, 10 Pages, Retrieved from the Internet: URL:http://www.3gpp.org/Meetings_3GPP_SYNC/SA2/Docs/S2-.

ZTE (Email Discussion Convener): "Summary of Email Discussion on Slicing WT1 (i.e. NS_WT #1) Assuming One UE—One Slice and Fully Separated Slices (i.e. a basic model)," 3GPP Draft, S2-163508 Network Slice Selection Topic-05, 3rd Generation Partnership Project (3GPP), Mobile Competence Centre, 650, Route Des Lucioles, F-06921 Sophia-Antipolis Cedex, France, vol. SA WG2, No. Vienna, Jul. 11, 2016-Jul. 15, 2016, Jul. 4, 2016 (Jul. 4, 2016), XP051121008, pp. 1-31, Retrieved from the Internet:

"3rd Generation Partnership Project; Technical Specification Group Services and System Aspects; Procedures for the 5G System; Stage 2 (Release 15)", 3GPP Standard; Technical Specification; 3GPP TS 23.502, 3rd Generation Partnership Project (3GPP), Mobile Competence Centre; 650, Route Des Lucioles ; F-06921 Sophia-Antipolis Cedex ; France, vol. SA WG2, No. V0.3.0, Apr. 20, 2017 (Apr. 20, 2017), XP051298172, pp. 1-116.

"3rd Generation Partnership Project; Technical Specification Group Services and System Aspects; System Architecture for the 5G System; Stage 2 (Release 15)", 3GPP Standard; Technical Specification; 3GPP TS 23.501, 3rd Generation Partnership Project (3GPP), Mobile Competence Centre 650, Route Des Lucioles; F-06921 Sophia-Antipolis Cedex; France, vol. SA WG2, No. V15.0.0, Dec. 22, 2017 (Dec. 22, 2017), XP051392101, pp. 1-181 p. 46, p. 50-p. 54, p. 81-p. 97.

"3rd Generation Partnership Project; Technical Specification Group Services System Aspects; System Architecture for the 5G System; Stage 2 (Release 15)", 3GPP Standard; Technical Specification 3GPP TS 23.501, 3rd Generation Partnership Project (3GPP), Mobile Competence Centre; 650, Route Des Lucioles; F-06921 Sophia-Antipolis Cedex; France, vol. SA WG2, No. V0.4.0, Apr. 20, 2017 (Apr. 20, 2017), XP051298169, pp. 1-124.

CATT: "Discussion on Slice Mobility Issue", 3GPP Draft; R3-180199 Slice Mobility, 3rd Generation Partnership Project (3GPP), Mobile Competence Centre; 650, Route Des Lucioles; F-06921 Sophia-Antipolis Cedex; France, vol. RAN WG3, No. Sophia Antipolis, France; Jan. 22, 2018-Jan. 26, 2018, Jan. 13, 2018 (Jan. 13, 2018),

(56) References Cited

OTHER PUBLICATIONS

XP051387519, 5 Pages, Retrieved from the Internet: URL:http://www.3gpp.org/tsg_ran/WG3 lu/TSG_R3_AHGs/R3-AH-1801/Docs/R3-180199 slicemobility.doc [retrieved on Jan. 13, 2018].
Ericsson: "Further Mobility Procedures Descriptions for NW Slicing", 3GPP Draft; R3-170679 Slice Mobility Idle, 3rd Generation Partnership Project (3GPP), Mobile Competence Centre; 650, Route Des Lucioles; F-06921 Sophia-Antipolis Cedex; France vol. RAN WG3, No. Athens, Greece; Feb. 13, 2017-Feb. 17, 2017, Feb. 12, 2017 (Feb. 12, 2017), XP051213258, 3 Pages, Retrieved from the Internet: URL:http://www.3gpp.org/ftp/Meetings 3GPP_SYNC/RAN3/Docs/ [retrieved on Feb. 12, 2017].
Ericsson: "Slicing for LTE connected to 5G-CN", 3GPP Draft; R2-1704174—Slicing for LTE Connected to 5G-CN, 3rd Generation Partnership Project (3GPP), Mobile Competence Centre; 650, Route Des Lucioles; F-06921 Sophia-Antipolis Cedex; France, vol. RAN WG2, No. Hangzhou, China; May 19, 2017 May 5, 2017, XP051264059, Retrieved from the Internet: URL:http://www.3gpp.org/ftp/tsg_ran/WG2_RL2/TSGR2_98/Docs/ [retrieved on May 5, 2017], 4 pages.
Qualcomm Incorporated: "23.501: PDU Session Release due to slice modification", 3GPP Draft; S2-179348 8697 23.501 PDU Session Release, 3rd Generation Partnership Project (3GPP), Mobile Competence Centre; 650, Route Des Lucioles; F-06921 Sophia-Antipolis Cedex; France vol. SA WG2, No. Reno, Nevada, USA; Nov. 27, 2017-Dec. 1, 2017, Nov. 30, 2017 (Nov. 30, 2017), XP051365875, 2 Pages, Retrieved from the Internet: URL:http://www.3gpp.org/Meetings_3GPP_SYNC/SA2/Docs/S2-179348_8697_23.501 PDU—session release.doc [retrieved on Nov. 30, 2017].
Qualcomm Incorporated: "TS 23.502: Handling of PDU Sessions at Slice Unavailability", 3GPP Draft; S2-173106-23.502—Slicing PDU Session Handling, 3rd Generation Partnership Project (3GPP), Mobile Competence Centre; 650, Route Des Lucioles; F-06921 Sophia-Antipolis Cedex; France vol. SA WG2, No. Hangzhou; May 15, 2017-May 19, 2017 May 9, 2017, XP051268576, Retrieved from the Internet: URL:http://www.3gpp.org/ftp/tsg_sa/WG2_Arch/TSGS2_121 Hangzhou/Docs/ [retrieved on May 9, 2017], 31 pages.
Telecom Italia et al., "Network Slice Repository Function (NSRF)", 3GPP Draft; S2-171744 NSRF Arch & Func Overview Final, 3rd Generation Partnership Project (3GPP), Mobile Competence Centre; 650, Route Des Lucioles; F-06921 Sophia-Antipolis Cedex; France, vol. SA WG2, No. Busan, Korea; Mar. 27, 2017-Mar. 31, 2017, Mar. 26, 2017, XP051247484, Retrieved from the Internet: URL:http://www.3gpp.org/ftp/Meetings_3GPP_SVNC/SA2/Docs/ [retrieved on Mar. 26, 2017], 17 pages.
LG Electronics., et al., "TS 23.502 P-CR New Procedure on NW Initiated UE Configuration Update", SA WG2 Meeting #120, S2-171854, Mar. 27-31, 2017, Busan, South Korea, pp. 1-4.
LG Electronics: "TS 23.502: Update of Registration procedure", SA WG2 Meeting #120, S2- 171853, Mar. 27-31, 2017, Busan, Republic of Korea, pp. 1-6.
Qualcomm Inc., et al., "TS 23.501: Updates to Network Slicing Description", SA WG2 Meeting #S2-120, S2-172787, Mar. 27-31, 2017, Busan, South Korea, pp. 1-9.

\* cited by examiner

ENABLE A NETWORK-TRIGGER CHANGE OF NETWORK SLICES

CROSS REFERENCES

The present Application for Patent is a continuation of U.S. patent application Ser. No. 15/963,654 by Faccin, et al., entitled, "Enable A Network-Trigger Change of Network Slices" filed Apr. 26, 2018, which claims priority to U.S. Provisional Patent Application No. 62/505,904 by Faccin, et al., entitled "Enable A Network-Trigger Change of Network Slices," filed May 13, 2017, assigned to the assignee hereof.

INTRODUCTION

The following relates generally to wireless communication, and more specifically to enable a network-trigger change of network slices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE). In some examples, of the wireless communications systems, a UE may use one or more network slices. A network slice is a logical network including Radio Access Network (RAN) and Core Network (CN). A network slice provides services and network capabilities, which may vary or be the same from network slice to network slice. A UE may access multiple network slices simultaneously through a RAN.

SUMMARY

A method for wireless communication at a source access and mobility management function (AMF) is described. The method may include determining to modify current-allowed network slices supported for a UE based at least in part on a network-trigger; identifying new-allowed network slices supported for the UE based at least in part on the determining; selecting a target AMF based at least in part on the new-allowed network slices, the target AMF is accessible by the source AMF; and triggering an AMF relocation based at least in part on the selecting.

An apparatus for wireless communication is described. The apparatus may include means for determining to modify current-allowed network slices supported for a UE based at least in part on a network-trigger; means for identifying new-allowed network slices supported for the UE based at least in part on the determining; means for selecting a target AMF based at least in part on the new-allowed network slices, the target AMF is accessible by the source AMF; and means for triggering an AMF relocation based at least in part on the selecting.

Another apparatus for wireless communication is described. The apparatus may include a processor, memory in electronic communication with the processor. The processor and memory may be configured to determine to modify current-allowed network slices supported for a UE based at least in part on a network-trigger; identify new-allowed network slices supported for the UE based at least in part on the determining; select a target AMF based at least in part on the new-allowed network slices, the target AMF is accessible by the source AMF; and trigger an AMF relocation based at least in part on the selecting.

A non-transitory computer readable medium for wireless communication is described. The non-transitory computer-readable medium may include instructions operable to cause a processor to determine to modify current-allowed network slices supported for a UE based at least in part on a network-trigger; identify new-allowed network slices supported for the UE based at least in part on the determining; select a target AMF based at least in part on the new-allowed network slices, the target AMF is accessible by the source AMF; and trigger an AMF relocation based at least in part on the selecting.

Some examples of the method, apparatus, and non-transitory computer-readable medium described above may further include processes, features, means, or instructions for determining that the UE has an active network slice instance (NSI) associated with at least one network selection assistance information (NSSAI); and identifying that an active NSI is supported by the new-allowed network slices. Some examples of the method, apparatus, and non-transitory computer-readable medium described above may further include processes, features, means, or instructions for generating a status report indicating a status of all existing protocol data unit (PDU) sessions associated with the active NSI.

Some examples of the method, apparatus, and non-transitory computer-readable medium described above for triggering the AMF relocation may further include processes, features, means, or instructions for transmitting an AMF relocation request to the target AMF based at least in part on the new-allowed NSSAI, the AMF relocation request comprises a status of all existing PDU session associated with the active NSI that are supported and active, or a new radio (NR) globally unique temporary identifier (GUTI), or both.

Some examples of the method, apparatus, and non-transitory computer-readable medium described above may further include processes, features, means, or instructions for triggering a release procedure of an active PDU session associated with the current-allowed network slices based at least in part on identifying that the active PDU session is unsupported by the new-allowed network slices. In some examples of the method, apparatus, and non-transitory computer-readable medium described above, the triggering the release procedure is based at least in part on direct signaling to the UE.

Another method for wireless communication at a target AMF is described. The method may include receiving, from a source AMF, an AMF relocation request for a UE currently served by the source AMF, the AMF relocation request comprising new-allowed network slices and UE context information; allocating an updated identifier based at least in part on the AMF relocation request; and transmitting to the UE a configuration request message comprising the updated identifier, an updated status of an existing PDU session, or the new-allowed network slices, or a combination.

Another apparatus for wireless communication is described. The apparatus may include means for receiving, from a source network entity, an AMF relocation request for a UE currently served by the source network entity, the AMF relocation request comprising new-allowed network slices and UE context information; means for allocating an updated identifier based at least in part on the AMF relocation request; and means for transmitting to the UE a configuration request message comprising the updated identifier, an updated status of an existing PDU session, or the new-allowed network slices, or a combination.

Another apparatus for wireless communication is described. The apparatus may include a processor, memory in electronic communication with the processor. The processor and memory may be configured to receive an AMF relocation request for a UE currently served by a source AMF, the AMF relocation request comprising new-allowed network slices and UE context information; allocate an updated identifier based at least in part on the AMF relocation request; and transmit to the UE a configuration request message comprising the updated identifier, an updated status of an existing PDU session, or the new-allowed network slices, or a combination.

Another non-transitory computer readable medium for wireless communication is described. The non-transitory computer-readable medium may include instructions operable to cause a processor to receive an AMF relocation request for a UE currently served by a source AMF, the AMF relocation request comprising new-allowed network slices and UE context information; allocate an updated identifier based at least in part on the AMF relocation request; and transmit to the UE a configuration request message comprising the updated identifier, an updated status of an existing PDU session, or the new-allowed network slices, or a combination.

In some examples of the method, apparatus, and non-transitory computer-readable medium described above, the updated identifier comprises NR GUTI. In some examples of the method, apparatus, and non-transitory computer-readable medium described above, the where the UE context information comprises a status of an existing PDU session associated with an active NSI or a current NR GUTI, or a combination.

Another method for wireless communication at a UE is described. The method may include receiving, from a source AMF, a configuration message comprising an identifier associated with a target AMF, a status of existing active PDU sessions of the UE, or new-allowed network slices, or a combination; storing information associated with the new-allowed network slices and identifier; identifying an active PDU session based at least in part on the status of the existing active PDU sessions of the configuration message, where the active PDU session is unsupported by the new-allowed network slices; and locally releasing the active PDU session.

Another apparatus for wireless communication is described. The apparatus may include means for receiving, from a source AMF, a configuration message comprising an identifier associated with a target AMF, a status of existing active PDU sessions of the UE, or new-allowed network slices, or a combination; means for storing information associated with the new-allowed network slices and identifier; means for identifying an active PDU session based at least in part on the status of the existing active PDU sessions of the configuration message, the active PDU session is unsupported by the new-allowed network slices; and means for locally releasing the active PDU session.

Another apparatus for wireless communication is described. The apparatus may include a processor, memory in electronic communication with the processor. The processor and memory may be configured to receive, from a source AMF, a configuration message comprising an identifier associated with a target AMF, a status of existing active PDU sessions of the UE, or new-allowed network slices, or a combination; store information associated with the new-allowed network slices and identifier; identify an active PDU session based at least in part on the status of the existing active PDU sessions of the configuration message, the active PDU session is unsupported by the new-allowed network slices; and locally release the active PDU session.

Another non-transitory computer readable medium for wireless communication is described. The non-transitory computer-readable medium may include instructions operable to cause a processor to receive, from a source AMF, a configuration message comprising an identifier associated with a target AMF, a status of existing active PDU sessions of the UE, or new-allowed network slices, or a combination; store information associated with the new-allowed network slices and identifier; identify an active PDU session based at least in part on the status of the existing active PDU sessions of the configuration message, the active PDU session is unsupported by the new-allowed network slices; and locally release the active PDU session.

In some examples of the method, apparatus, and non-transitory computer-readable medium described above, the identifier comprises a NR GUTI.

Another method for wireless communication at a source AMF is described. The method may include determining to modify current-allowed network slices used by a UE based at least in part on a received network-trigger; identifying new-allowed network slices for the UE based at least in part on the determining; and determining that a target AMF associated with the new-allowed network slices is inaccessible by the source AMF.

Another apparatus for wireless communication is described. The apparatus may include means for determining to modify current-allowed network slices used by a UE based at least in part on a received network-trigger; means for identifying new-allowed network slices for the UE based at least in part on the determining; and means for determining that a target AMF associated with the new-allowed network slices is inaccessible by the source AMF.

Another apparatus for wireless communication is described. The apparatus may include a processor, memory in electronic communication with the processor. The processor and memory may be configured to determine to modify current-allowed network slices used by a UE based at least in part on a received network-trigger; identify new-allowed network slices for the UE based at least in part on the determining; and determining that a target AMF associated with the new-allowed network slices is inaccessible by apparatus.

Another non-transitory computer readable medium for wireless communication is described. The non-transitory computer-readable medium may include instructions operable to cause a processor to determine to modify current-allowed network slices used by a UE based at least in part on a received network-trigger; identify new-allowed network slices for the UE based at least in part on the determining; and determining that a target AMF associated with the new-allowed network slices is inaccessible by a source AMF.

Some examples of the method, apparatus, and non-transitory computer-readable medium described above may further include processes, features, means, or instructions for transmitting a de-registration request to the UE based at least in part on determining that the target AMF is inaccessible by the source AMF. In some examples of the method, apparatus, and non-transitory computer-readable medium described above, the de-registration request comprises an indication to perform a re-registration procedure, the new-allowed network slices, or a code indicating that the de-registration request is in response to a change of supported network slices, or a combination. Some examples of the method, apparatus, and non-transitory computer-readable medium described above may further include processes, features, means, or instructions for triggering a release procedure of an active PDU session associated with current-allowed network slices that are unsupported by the new-allowed network slices; and releasing UE context comprising a status report of active PDU session or a NR GUTI, or both based at least in part on the triggering.

Another method for wireless communication at a UE is described. The method may include identifying a re-registration request and a code indicating a request to register a set of network slices associated with a new-allowed network slice based at least in part on a received de-registration request from a source AMF that is serving the UE; identifying the new-allowed network slices based at least in part on the received de-registration request; and generating a request for registering the set of network slices based at least in part on the code.

Another apparatus for wireless communication is described. The apparatus may include a means for identifying a re-registration request and a code indicating a request to register a set of network slices associated with a new-allowed network slice based at least in part on a received de-registration request from a source AMF that is serving the UE; means for identifying the new-allowed network slices based at least in part on the received de-registration request; and means for generating a request for registering the set of network slices based at least in part on the code.

Another apparatus for wireless communication is described. The apparatus may include a processor, memory in electronic communication with the processor. The processor and memory may be configured to identify a re-registration request and a code indicating a request to register a set of network slices associated with a new-allowed network slice based at least in part on a received de-registration request from a source AMF that is serving the UE; identify the new-allowed network slices based at least in part on the received de-registration request; and generate a request for registering the set of network slices based at least in part on the code.

A non-transitory computer readable medium for wireless communication is described. The non-transitory computer-readable medium may include instructions operable to cause a processor to identify a re-registration request and a code indicating a request to register a set of network slices associated with a new-allowed network slice based at least in part on a received de-registration request from a source AMF that is serving the UE; identify the new-allowed network slices based at least in part on the received de-registration request; and generate a request for registering the set of network slices based at least in part on the code.

Some examples of the method, apparatus, and non-transitory computer-readable medium described above may further include processes, features, means, or instructions for storing information associated with the new-allowed network slices, where the information comprises NSSAI. Some examples of the method, apparatus, and non-transitory computer-readable medium described above may further include processes, features, means, or instructions for removing a current NR GUTI based at least in part on the code.

In some examples of the method, apparatus, and non-transitory computer-readable medium described above, an upper layer of the UE transmits to a lower layer of the UE: an indication to release a connection with a RAN and to re-establish the connection, or a NSSAI request, or an indication to refrain from providing a NR GUTI, or a combination. In some examples of the method, apparatus, and non-transitory computer-readable medium described above, the upper layer comprises a non-access stratum (NAS) layer and the lower layer comprises an AS layer.

Some examples of the method, apparatus, and non-transitory computer-readable medium described above may further include processes, features, means, or instructions for transmitting a request to re-establish the connection based at least in part on the indication to re-establish the connection, where the request comprises the NSSAI request. In some examples of the method, apparatus, and non-transitory computer-readable medium described above, the connection comprises a radio resource control (RRC) connection. In some examples of the method, apparatus, and non-transitory computer-readable medium described above, the UE performs a RRC connection release procedure or an RRC connection establishment procedure based at least in part on the indication to release a connection with a RAN and to re-establish the connection.

In some examples of the method, apparatus, and non-transitory computer-readable medium described above, the connection comprises an internet protocol (IP) security (IPsec) tunnel connection. In some examples of the method, apparatus, and non-transitory computer-readable medium described above, the UE performs an IPsec tunnel release procedure or an IPsec tunnel establishment procedure based at least in part on the indication to release a connection with a RAN and to re-establish the connection.

Some examples of the method, apparatus, and non-transitory computer-readable medium described above may further include processes, features, means, or instructions for transmitting a new RRC reconfiguration request message comprising a the NSSAI request, or a code indicating signaling path configuration, or a current NR GUTI, or a combination. Some examples of the method, apparatus, and non-transitory computer-readable medium described above may further include processes, features, means, or instructions for transmitting a Nwu message comprising the NSSAI request, or a code indicating signaling path configuration, or a current NR GUTI, or a combination. In some examples of the method, apparatus, and non-transitory computer-readable medium described above, the Nwu message comprises an IKEv2 INFORMATIONAL message, or a reconfigure signaling connection message, or both.

Another method for wireless communication an access network (AN) is described. The method may include receiving, from a UE a RRC connection request comprising NSSAI; identifying a source AMF associated with current-allowed network slices of the UE based at least in part on the NSSAI; determining to modify the NSSAI based at least in part on a trigger indication; identifying new-allowed network slices supported for the UE based at least in part on the determining; selecting a target AMF to serve the UE based at least in part on the new-allowed network slices; and triggering an AMF relocation based at least in part on the selecting, where the AMF relocation comprises signaling the source AMF to redirect the RRC connection request to the target AMF.

Another apparatus for wireless communication is described. The apparatus may include means for receiving, from a UE a RRC connection request comprising NSSAI; means for identifying a source AMF associated with current-allowed network slices of the UE based at least in part on the NSSAI; means for determining to modify the NSSAI based at least in part on a trigger indication; means for identifying new-allowed network slices supported for the UE based at least in part on the determining; means for selecting a target AMF to serve the UE based at least in part on the new-allowed network slices; and means for triggering an AMF relocation based at least in part on the selecting, where the AMF relocation comprises signaling the source AMF to redirect the RRC connection request to the target AMF.

Another apparatus for wireless communication is described. The apparatus may include a processor, memory in electronic communication with the processor. The processor and memory may be configured to receive, from a UE a RRC connection request comprising NSSAI; identify a source AMF associated with current-allowed network slices of the UE based at least in part on the NSSAI; determine to modify the NSSAI based at least in part on a trigger indication; identify new-allowed network slices supported for the UE based at least in part on the determining; select a target AMF to serve the UE based at least in part on the new-allowed network slices; and trigger an AMF relocation based at least in part on the selecting, where the AMF relocation comprises signaling the source AMF to redirect the RRC connection request to the target AMF.

Another non-transitory computer readable medium for wireless communication is described. The non-transitory computer-readable medium may include instructions operable to cause a processor to receive, from a UE a RRC connection request comprising NSSAI; identify a source AMF associated with current-allowed network slices of the UE based at least in part on the NSSAI; determine to modify the NSSAI based at least in part on a trigger indication; identify new-allowed network slices supported for the UE based at least in part on the determining; select a target AMF to serve the UE based at least in part on the new-allowed network slices; and trigger an AMF relocation based at least in part on the selecting, where the AMF relocation comprises signaling the source AMF to redirect the RRC connection request to the target AMF.

Another method for wireless communication is described. The method may include receiving, from a UE a request for relocation from a source AMF associated with current-allowed network slices of the UE based at least in part on network slice assistance information; determining to modify the NSSAI based at least in part on a trigger indication; identifying new-allowed network slices supported for the UE based at least in part on the determining; selecting a target AMF to serve the UE based at least in part on the new-allowed network slices; and triggering an AMF relocation based at least in part on the selecting, where the AMF relocation comprises initiating a redirection of the UE from the source AMF to the target AMF.

Another apparatus for wireless communication is described. The apparatus may include means for receiving, from a UE a request for relocation from a source AMF associated with current-allowed network slices of the UE based at least in part on network slice assistance information; means for determining to modify the NSSAI based at least in part on a trigger indication; means for identifying new-allowed network slices supported for the UE based at least in part on the determining; means for selecting a target AMF to serve the UE based at least in part on the new-allowed network slices; and means for triggering an AMF relocation based at least in part on the selecting, where the AMF relocation comprises initiating a redirection of the UE from the source AMF to the target AMF.

Another apparatus for wireless communication is described. The apparatus may include a processor, memory in electronic communication with the processor. The processor and memory may be configured to receive, from a UE a request for relocation from a source AMF associated with current-allowed network slices of the UE based at least in part on network slice assistance information; determine to modify the NSSAI based at least in part on a trigger indication; identify new-allowed network slices supported for the UE based at least in part on the determining; select a target AMF to serve the UE based at least in part on the new-allowed network slices; and trigger an AMF relocation based at least in part on the selecting, where the AMF relocation comprises initiating a redirection of the UE from the source AMF to the target AMF.

Another non-transitory computer readable medium for wireless communication is described. The non-transitory computer-readable medium may include instructions operable to cause a processor to receive, from a UE a request for relocation from a source AMF associated with current-allowed network slices of the UE based at least in part on network slice assistance information; determine to modify the NSSAI based at least in part on a trigger indication; identify new-allowed network slices supported for the UE based at least in part on the determining; select a target AMF to serve the UE based at least in part on the new-allowed network slices; and trigger an AMF relocation based at least in part on the selecting, where the AMF relocation comprises initiating a redirection of the UE from the source AMF to the target AMF.

Some examples of the method, apparatus, and non-transitory computer-readable medium described above may further include processes, features, means, or instructions for transmitting an indication comprising information for selection of the target AMF for redirecting the RRC connection request; and transmitting instructions for performing the redirecting via the source AMF.

Some examples of the method, apparatus, and non-transitory computer-readable medium described above may further include processes, features, means, or instructions for establishing an N2 signaling connection with the target AMF; and transmitting a NAS message received from the UE to the target AMF using the N2 signaling connection.

Some examples of the method, apparatus, and non-transitory computer-readable medium described above may further include processes, features, means, or instructions for transmitting, to a previous serving AMF of the UE, a request to release an N2 signaling connection. Some examples of the method, apparatus, and non-transitory computer-readable medium described above may further include processes, features, means, or instructions for receiving, from the target AMF, an updated NR GUTI for the UE; and replacing a previous NR GUTI with the received updated NR GUTI for the UE.

Some examples of the method, apparatus, and non-transitory computer-readable medium described above may further include processes, features, means, or instructions for receiving, from a target AMF, an updated NR GUTI for the UE; and replacing the previous NR GUTI with the received updated NR GUTI for the UE. Some examples of the method, apparatus, and non-transitory computer-readable medium described above may further include processes, features, means, or instructions for transmitting, to the UE, a configuration request message containing the updated NR GUTI, a status of existing active PDU sessions of the UE, indication of the modifying to the NSSAI, or a combination.

DETAILED DESCRIPTION

Figure 1:
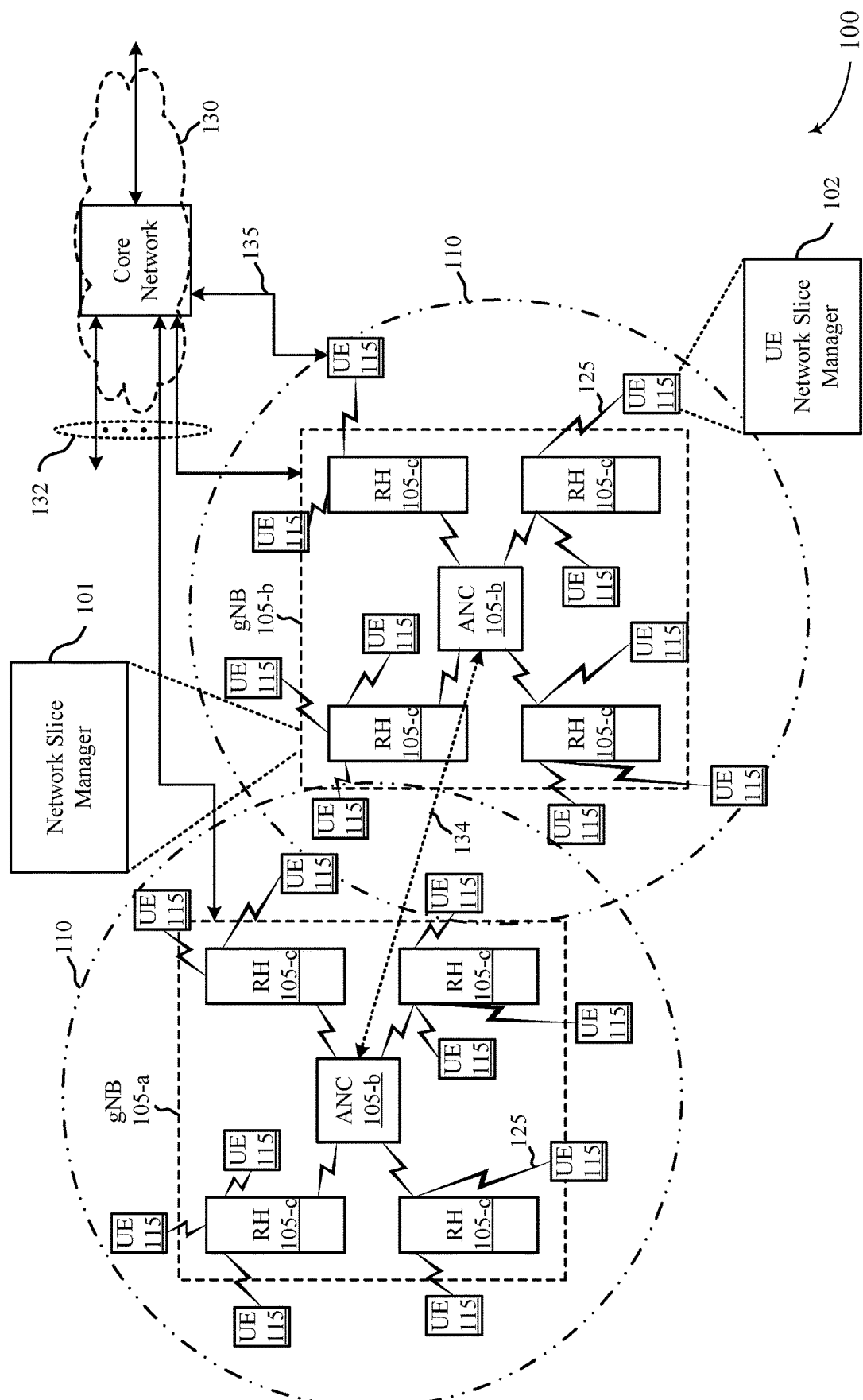
FIGS. 1 and 2 illustrate examples of a wireless communications system that supports enabling a network-trigger change of network slices, in accordance with one or more aspects of the present disclosure.

The described features generally relate to methods, systems, and devices for wireless communication that supports enabling a network-trigger change of network slices. A UE may establish a protocol data unit (PDU) session for a logical data network. The logical data network may also be referred to as a network slice. In some cases, a UE may select a network slice based on an application or subscription service. For example, a UE may have an application that is an internet protocol (IP) multimedia systems (IMS) voice application, the UE may select a network slice that is configured to support this mobile broadband application. A UE may, additionally or alternatively, have an application that is configured as an Internet of Everything (IoT) application; for example, the IoT application may configure the UE to operate as an IoT gateway device that compiles and transmits data to a remote server, periodically. As such, the UE may select a network slice that is configured to support massive IoT data traffic. By having different network slices serving different applications or subscriptions, etc. the UE may improve its resource utilization in a network, while also satisfying performance requirements of individual applications of the UE.

The network slices of the UE may be served by an access and mobility management function (AMF). In addition, session management of the network slices may be performed by a session management function (SMF). The network may determine a change in a set of allowed network slices for a UE. This change may be identified; for example, by comparing previous allowed network slices to new-allowed network slices. The previous allowed network slices may include a set of network slices allowed for a UE, before the network determines a change in the set of allowed network slices. In addition, the new-allowed network slices may include a set of network slices allowed for the UE, after the network determines a change in the set of allowed network slices. The network may, in some cases, provide network slice selection assistance information (NSSAI) or a set of allowed NSSAIs (S-NSSAI) to the UE. The NSSAI may include information indicating allowed or supported network slices for the UE to use, among other information.

The network may change a set of network slices for a UE. For example, in the case that that a new network slice is identified in the set of new-allowed network slices, a current AMF serving the UE may determine a lack of capabilities to service the new network slice. As a result, an AMF that can service the new network slice may be identified. In other words, a change in a set of allowed network slices may involve a change in a serving AMF. In one aspect, a current AMF may reach out to a new AMF. The new AMF may not serve isolated network slices. In another aspect, the new-allowed network slices may be isolated. In other words, the current AMF serving the new-allowed network slices may require a new AMF that is not accessible by other AMFs. In some examples, the network may change a set of network slices that the UE is using, while the UE is in an RM-REGISTERED state.

In the RM-REGISTERED state, the UE may already be registered with an AMF for one or more network slices. The UE may indicate the one or more network slices in an initial NSSAI request during an initial registration procedure with the AMF. In the case the network changes the set of network slices, the network may transmit a new NSSAI to the UE. The UE may receive the new NSSAI. The UE may re-register with a requested NSSAI including the current S-NSSAI the UE is registered with and a new S-NSSAI. Because of the new requested NSSAI, if the network determines that a different AMF (i.e., not the current AMF) is required to serve the UE, the network may identify and select a new AMF.

In some cases, the UE performs a de-registration procedure. The network may disallow a direct transfer between a serving AMF and a new target AMF because the new AMF is associated with a different registration area or is isolated. In this case, session and service continuity may not be considered, where the de-registration procedure is suitable. However, existing de-registration procedures may not provide sufficient information for the UE to act accordingly. Alternatively, a network may utilize generic UE configuration update procedure to update a set of NSSAI that the UE is allowed to use, by providing a new set of NSSAI in the UE configuration update request message. However, in some cases the UE may not be required to perform a re-registration due to the change of NSSAI (e.g. a new network slice may be available and the UE requires connectivity to it, or applications that were using a network slice may no longer be available on PDU sessions of another network slice to which the UE is not registered). As a result, the UE may acknowledge the update of allowed NSSAI with a UE configuration update complete message. If the UE requests additional S-NSSAI other than received values (e.g. S-NSSAI in the configured NSSAI that was not requested previously), then the UE may initiate a registration procedure. The network may then confirm with the registration accept message. However, simply notifying the UE may not be sufficient in terms of usage of temporary ID (e.g., 5G GUTI) and NSSAI requests.

As such, existing solutions do not support relocation of a serving AMF for a UE when the current AMF can reach a target AMF (i.e., the target AMF does not serve isolated slices) or when the new-allowed network slices are isolated (i.e., the AMF serving the new network slice(s) requires a separate AMF not reachable by other AMFs). The present disclosure provides techniques for AMF relocation based on network-triggering changes of network slices. According to one technique, a current AMF may identify a request to change a current-allowed NSSAI for a UE. The current AMF may identify a request to modify the current-allowed NSSAI based on a policy control function (PCF) indication or an indication designating a change in a subscription of a network slice. In some examples, the request may include a new-allowed NSSAI.

The current AMF may select a new AMF based on the new-allowed NSSAI. If a new AMF can be selected and reached by the current AMF, the current AMF may determine whether the UE has an active NSI of S-NSSAI associated with the current-allowed NSSAIs or an active NSI that is absent in the new-allowed NSSAI, or both. The current AMF may generate a UE context and transmit the UE context to the new AMF. The UE context may include a UE PDU status for all existing UE PDU sessions for each active network slice, associated with the new-allowed NSSAI. As such, the network-triggering change of network slices results in the current AMF triggering the AMF relocation (i.e., a change from a current AMF to a new AMF).

The current AMF may transmit an AMF relocation request to a new AMF. The AMF relocation request may include a new-allowed NSSAI or UE context, or both. Additionally, the current AMF may trigger a PDU release procedure for each active UE PDU session that is not supported in the new-allowed NSSAI. The new AMF may receive the relocation request from the current AMF (i.e., now previous AMF). Based on the relocation request, the new AMF may transmit an indication, to one or more SMFs associated with an active UE PDU session, identifying the change to the AMF. In some examples, the UE may have a plurality of active UE PDU sessions. The new AMF may determine and allocate a NR (e.g., or other 5G network identifier) GUTI for the UE. The UE may receive the NR GUTI from the new AMF in a message; for example, in a UE configuration request message. The message may also include a status provided by the previous AMF or the new-allowed NSSAI, or both. The status may indicate UE PDU sessions for each active network slice. In some examples, the status may indicate a plurality of UE PDU sessions for a plurality of active network slices. Upon receiving the message from the new AMF, the UE may store the new-allowed NSSAI, the new NR GUTI and release the active UE PDU sessions that are absent in the UE PDU session status.

In some cases, the UE may determine that an additional network slice is required in addition to the network slices included in the new-allowed NSSAI that were absent in the previous allowed NSSAI. The UE may re-register with the network based on the determination that additional network slices are required. For example, in the previous allowed NSSAI, the UE may have been assigned network slices 0-3; however, in the new-allowed NSSAI, the UE may be assigned network slices 1, 2, and 4. As such, the UE may determine that network slice 4 needs to be registered. As part of re-registering with the network, the UE may transmit an NSSAI request. The NSSAI request may include the additional network slice in addition to the currently registered network slices.

According to a second technique, a de-registration procedure may be triggered by the network. In this case, the current AMF may identify a request to change one or more network slices associated with a current-allowed NSSAI. In response to identifying the request, the current AMF may select a new AMF to serve the network slices associated with the new-allowed NSSAI. However, the current AMF may determine that the new AMF is not accessible. As a result, the current AMF may transmit a de-registration request to the UE. The de-registration request may include an indication to perform a re-registration procedure. Additionally, the de-registration request may include the new-allowed NSSAI or a cause code indicating a new registration request for a set of network slices due to an AMF change, or both.

In some cases, the current AMF may refrain from releasing an N2 signaling connection, until a request to release the connection is received from the network (e.g. RAN). In the case that the current AMF receives the request from the network, the current AMF may trigger a PDU release procedure. This procedure may include that for each active UE PDU session that is not supported in the new-allowed NSSAI, that the UE PDU session be released. When all UE PDU sessions are released, the AMF may also release the UE context.

The UE may receive the de-registration request from the current AMF. In some cases, the UE may determine that the de-registration request includes a re-registration request; for example, the re-registration request may be identified in a cause code indicating a new registration request for a new network slice based on an AMF change. The UE may determine an allowed NSSAI based on the de-registration request, and store the allowed NSSAI locally or remotely, or both. In some cases, the UE may determine which network slices in the new-allowed NSSAI to connect to in order to create a NSSAI request.

Additionally or alternatively, the UE may analyze the cause code to execute additional operations. The UE may, for example, remove a current GUTI (e.g., 5G GUTI) based on the cause code. In some cases, an upper layer (e.g., NAS layer) of the UE may indicate to a lower layer (e.g., AS layer) to release a signaling connection or to reestablish a signaling connection with the network, or both based on the cause code. The UE may transmit a request to reestablish a signaling connection including the NSSAI request, to the network.

In some examples, the signaling connection may be an RRC connection. In this case, the UE may perform an RRC connection release or an RRC connection establishment procedure, or both. The network may receive the signaling indication associated with the RRC connection release or RRC connection establishment procedure. The signaling indication may include an NSSAI request. The NSSAI request may contain indication of requested network slices based on the NSSAI. According to one technique, the network may determine a change in NSSAI for a UE. The network may modify the current-allowed NSSAI based on a PCF indication or an indication designating a change in a subscription of a network slice. In some examples, the modification may include identifying new-allowed network slices supported for the UE, alone or in addition to the network slices of the NSSAI request. The network may select a new AMF to serve the network slices associated with the new-allowed NSSAI and initiate an AMF relocation for the signaling connection of the RRC connection release or RRC connection establishment. In other words, a change in a set of allowed network slices may involve a change in a serving AMF for RRC connectivity. In one aspect, a current AMF may reach out to a new AMF. Communication between the current AMF and the new AMF may be redirected via the network or established via a direct connection between the AMFs. Alternatively, the signaling connection may be a Nwu connection; for example, an IPSec tunnel connection. In this case, the UE may release or reestablish the IPSec tunnel connection, or both.

In some cases, an upper layer (e.g., NAS layer) of the UE may indicate to a lower layer (e.g., AS layer) to modify a signaling connection with the network based on the cause code. In this case, the UE may transmit a message (e.g., new RRC reconfiguration request message or Nwu signaling) to the network to modify a signaling connection. In some cases, the RRC reconfiguration message or the Nwu signaling may include the NSSAI request, or a signaling path reconfiguration indicated by the cause code, or a current GUTI (e.g., 5G GUTI), or a combination thereof to the network. Additionally, the UE may include a NAS message including the NSSAI request in the RRC reconfiguration message. In some cases, the message transmitted to the network by the UE may be an IKEv2 INFORMATIONAL message. This message may be identified by an exchange type value set to a predetermined number (e.g., 37), or a new reconfiguration signaling connection message identified by an exchange type value set between a predetermined range (e.g., a value between 240 and 255) that may be reserved for private use. In some examples, the NSSAI request, the cause code indicating a signaling path reconfiguration, or the GUTI, or a combination thereof may be included in a generic payload with a payload type set to a predetermined number (e.g., 43) to indicate a vendor ID payload.

The network may receive the RRC reconfiguration request message from the UE. At this point, the network may select a serving AMF based on the NSSAI request included in the RRC reconfiguration request message. According to one technique, the network may evaluate considerations of the current-allowed network slices associated with the NSSAI request. In some cases, network may determine a change in NSSAI for the UE. The network may modify the current-allowed NSSAI based on a PCF indication or an indication designating a change in a subscription of a network slice. In some examples, the modification may include identifying new-allowed network slices supported for the UE, alone or in addition to the network slices of the NSSAI request. The network may select a new AMF to serve the network slices associated with the new-allowed NSSAI and initiate an AMF relocation. In other words, a change in a set of allowed network slices may involve a change in a serving AMF. In one aspect, a current AMF may reach out to a new AMF. The network may establish an N2 signaling connection with the serving AMF and transmit the NAS message received from the UE. Additionally or alternatively, the network may transmit a request, to release an N2 signaling connection, to a previous AMF. Once the network registers with the serving AMF, the network may receive from the serving AMF a new GUTI for the UE. As a result, the network may transmit the new GUTI to the UE. In some examples, the network may transmit same message as the UE. For example, the network may transmit the new GUTI in a generic payload with a payload type associated with a vendor ID payload.

Aspects of the disclosure are initially described in the context of a wireless communications system. Exemplary UEs, base stations (e.g., eNB, gNB), systems, and process flow for AMF relocation based on network-triggering changes of network slices are then described. Aspects of the disclosure are further illustrated by and described with reference to apparatus diagrams, system diagrams, and flowcharts that relate to enabling a network-trigger change of network slices.

FIG. 1 illustrates an example of a wireless communications system 100 that supports enabling a network-trigger change of network slices, in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a Long Term Evolution (LTE), LTE-Advanced (LTE-A) network, or a NR network. In some cases, wireless communications system 100 may support enhanced broadband communications, ultra-reliable (i.e., mission critical) communications, low latency communications, and communications with low-cost and low-complexity devices.

UE 115 may establish multiple PDU sessions for multiple network slices. In some cases, UE 115 may select a network slice based on an application or subscription service. By having different network slices serving different applications or subscriptions, etc. UE 115 may improve its resource utilization in wireless communications system 100, while also sustaining performance requirements of individual applications of the UE 115. In some cases, the network slices used by UE 115 may be served by an AMF associated with base station 105 or core network 130, or both. In addition, session management of the network slices may be performed by a SMF.

In some cases, a network (e.g., RAN) may determine a change in a set of allowed network slices for a UE 115. This change may be determined, for example, by comparing previous allowed network slices to new-allowed network slices. An AMF may, in some cases, provide NSSAI or a S-NSSAI to UE 115. The NSSAI may include information indicating allowed network slices for the UE 115 to use, among other information. The AMF may, in some cases, change a set of network slices for UE 115. For example, in the case that that a new network slice is identified in the set of new-allowed network slices, a serving AMF of UE 115 may determine that the serving AMF does not have capabilities to service the new network slice. As a result, an AMF that can service the new network slice may be identified. In other words, a change in a set of allowed network slices may involve a change in a serving AMF.

In the case a network changes the set of network slices, a serving AMF may transmit a new set of NSSAIs to UE 115. UE 115 may receive the new set of NSSAIs. In some cases, UE 115 may identify that the new set of NSSAIs includes a new S-NSSAIs to which the UE 115 may need to connect. UE 115 may re-register with a requested NSSAI including the current S-NSSAIs the UE 115 is registered with and one or more of the new S-NSSAIs. Because of the new requested NSSAI, if the serving AMF determines that a different AMF is required for the UE 115, the serving AMF may identify and select a new AMF. As a result, the wireless communications system 100 is capable of supporting network-triggered changes to network slices.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an IoE device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). A UE 115 may communicate with the core network 130 through communication link 135. Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the base stations 105 (e.g., eNodeBs (eNBs, network access devices, gNBs) 105-a, gNBs, or access node controllers (ANCs) may interface with the core network 130 through backhaul links 132 (e.g., S1, S2, etc.) and may perform radio configuration and scheduling for communication with the UEs 115. In some configurations, various functions of each access network entity or base station 105 may be distributed across various network devices (e.g., radio heads and access network controllers) or consolidated into a single network device (e.g., a base station 105).

One or more of network devices 105 may include a network slice manager 101, which may receive a network-trigger; determine to modify current-allowed network slice associated with a current-allowed NSSAI used by the UE 115 based on the received network-trigger; identify new-allowed NSSAI for the UE 115 based on the determining; and select a target AMF based on the new-allowed NSSAI, where the target AMF is accessible by the source AMF. The network slice manager 101 may alternatively, receive an AMF relocation request for UE 115 currently served by a source AMF, the AMF relocation request may include a new-allowed NSSAI and UE context information. The network slice manager 101 may allocate an updated NR GUTI for the UE 115 based on the AMF relocation request; and transmit to the UE 115 a configuration request message including the updated NR GUTI, an updated status of an existing UE PDU session, or the new-allowed NSSAI, or a combination thereof.

In some cases, network slice manager 101 may receive a network-trigger from a UE 115 served by a source AMF; determine to modify current-allowed NSSAI associated with a current-allowed S-NSSAI used by the UE 115 based on the received network-trigger; identify new-allowed NSSAI for the UE 115; and determine that a target AMF associated with the new-allowed NSSAI is inaccessible by the source AMF. Alternatively, in some cases, network slice manager 101 may receive from UE 115 a RRC connection request including NSSAI; select a target AMF to serve UE 115 based on the NSSAI; establish an N2 signaling connection with the selected AMF; and transmit NAS message received from the UE 115 to the selected AMF using the N2 signaling connection.

UEs 115 may include a network slice manager 102, which may receive, from a network device 105, a configuration message indicating a request to register one or more new network slices associated with a new-allowed network slice, a NR GUTI associated with a target AMF, a status of an existing active UE PDU session of the UE 115, or new-allowed NSSAI, or a combination thereof; store the new-allowed NSSAI and NR GUTI; identify an active UE PDU session based on the status of existing active UE PDU session information included in the configuration message, the identified active UE PDU session is unsupported in the new-allowed NSSAI; and release the identified active UE PDU session. Additionally or alternatively, the network slice manager 101 may identify a re-registration request and a code indicating a request to register a set of network slices associated with a new-allowed NSSAI based on a received de-registration request from a AMF that is serving the UE 115; identify the new-allowed NSSAI based on the received de-registration request; and generate an NSSAI request for registering the set of network slices based on the code.

In some examples, establishing a user plane connection to a data network via one or more network slice instances may include performing a resource management procedure to select an AMF that supports the one or more network slices. Additionally or alternatively, the management procedure may include establishing a PDU session to the data network via the network slice instance. UE 115 may register with a network (e.g., PLMN, LTE, NR). When UE 115 registers with the network, UE 115 may determine a configured NSSAI or an allowed NSSAI. UE 115 may provide to the network using RRC and NAS layer a NSSAI request based on determining a configured NSSAI or an allowed NSSAI. The NSSAI request may include S-NSSAI associated with the network slice to which UE 115 is requesting to register. In addition, the NSSAI request may include a temporary identifier (e.g., GUTI) assigned to UE 115.

The NSSAI request may include a configured NSSAI or a subset of the configured NSSAI, in the case that the UE 115 has an no allowed NSSAI or no allowed NSSAI. In some cases, the NSSAI request may include the allowed NSSAI, or a subset of the allowed NSSAI, one or more S-NSSAIs associated with the configured NSSAI for which no corresponding S-NSSAI is supported in the allowed NSSAI, and that were not previously supported by the network. The subset of allowed NSSAI may include an S-NSSAI associated the previous allowed NSSAI for the network, in some examples.

UE 115 may provide in the NSSAI request an S-NSSAI from the configured NSSAI that the UE 115 previously provided to the network in a current registration area. The NSSAI request may also be included in an RRC connection establishment message or in NAS message, or both. The network (e.g., RAN) may route NAS signaling between UE 115 and an AMF selected using the requested NSSAI obtained during an RRC connection establishment. If the network (e.g., RAN) is unable to select an AMF based on the requested NSSAI, the network may route the NAS signaling to an AMF from a set of default AMFs.

In some cases, upon registration, the UE 115 may be provided with a temporary identifier by a serving AMF. The temporary identifier may be included in one or more RRC connection establishment message during subsequent initial accesses to enable the network (e.g., RAN) to route the NAS signaling between the UE 115 and an appropriate AMF. The network may also return a new-allowed NSSAI identifying network slices permitted. The UE 115 may store the new-allowed NSSAI and override any previously stored allowed NSSAI for the network.

The network may also discard an S-NSSAI provided by UE 115 in a requested NSSAI with a discard cause code. In some examples, the network may transmit an indication identifying whether the discarded S-NSSAI is permanent (e.g. the S-NSSAI may not be supported by the network in at least the current registration area) or temporary (e.g. the network slice associated with the S-NSSAI may be temporarily unavailable). In some cases, when receiving from UE 115 a NSSAI request and a temporary identifier in an RRC message, if the network (e.g., RAN) determines capability to reach an AMF associated with the temporary identifier, the network may forward the request to the AMF. Alternatively, the network may select a suitable AMF based on the NSSAI request provided by the UE 115, and forward the request to the selected AMF. In some cases, if the network is unable to select an AMF based on the NSSAI request, then the request may be sent to a default AMF.

In some cases, when UE 115 registers with a network, if the UE has no configured NSSAI or allowed NSSAI, the network (e.g., RAN) may route some or all NAS signaling from and to UE 115 to a default AMF. UE 115 may also transmit an indication of an NSSAI in a RRC connection establishment or initial NAS message; unless, UE 115 has a configured NSSAI or allowed NSSAI for a corresponding network. In some cases, upon registration, UE 115 may receive a temporary identifier by an AMF. In addition, UE 115 may receive an allowed NSSAI identifying network slices permitted by the network for the UE 115. The network slices may part of the subscribed default S-NSSAI of the UE 115. The UE 115 may also include the temporary identifier in a RRC connection establishment message during subsequent initial accesses to enable the network to route NAS signaling between the UE 115 and an appropriate AMF.

In some examples, wireless communications system 100 may provide modification to a network slice for UE 115. In addition, wireless communications system 100 may provide modification to a set of network slices for UE 115. A set of network slices for UE 115 may change during one more time instances during and following registration with a network. In addition, a change to the set of network slices may be initiated by the network, or UE 115 based on one or more conditions. The network may change a set of network slices to which UE 115 is registered based on local policies; for example, subscription changes or UE mobility, or both.

In some cases, the network may trigger change to the set of network slices during a registration procedure. For example, an access node (AN) of the network may receive from UE 115 a RRC connection request including NSSAI; and determine a change in network slice considerations of the current-allowed NSSAI used by a source AMF of the registration procedure. The AN may determine to modify current-allowed NSSAI based on a network trigger of the local policies; and identify a new-allowed NSSAI including new-allowed network slices supported for the UE 115. In other cases, an of the network may receive a UE initiated request for relocation from a source AMF associated with a set of current-allowed network slices of a network connection. The AN may determine a change in network slice consideration of the current-allowed NSSAI used by the source AMF; and determine to modify current-allowed NSSAI based on local policies of the network and the relocation request.

The network may also select a new AMF based on the new-allowed NSSAI. In some cases, the network may determine that a redirection between a current AMF and the new selected AMF is possible. As a result, the network may trigger an AMF relocation towards the new AMF and the current AMF may transmit the new-allowed NSSAI to the new selected AMF. The current AMF may also trigger the release of PDU sessions for a S-NSSAI that are not supported by the new-allowed NSSAI. The current AMF may communicate with the new AMF according to redirection by the network or direct signaling between AMFs. Alternatively, the network may determine that relocation to a new AMF that supports the new-allowed NSSAI is not possible. As a result, the current AMF may transmit the new-allowed NSSAI to the UE 115 using a network-initiated de-registration procedure. The de-registration procedure may include an indication for the UE 115 to initiate a registration procedure with the updated and new S-NSSAI, and that the cause of the re-registration is due to the change of the supported network slices. As a result, the UE 115 may initiate a registration procedure including a NSSAI request based on the new-allowed NSSAI, an refrain from providing the current temporary identifier of UE 115.

A data network may be associated with an S-NSSAI. In some cases, a network operator may provide to UE 115 network slice selection policy (NSSP). The NSSP may include one or more NSSP rules, each one associating an application with a certain S-NSSAI. In some cases, a default rule may match all applications to a S-NSSAI. In some cases, a UE 115 application associated with a S-NSSAI may request data transmission. If UE 115 has one or more PDU sessions established and associated with the S-NSSAI, UE 115 may route the user data of this application in one of these PDU sessions, unless other conditions in the UE 115 disallow the use of these PDU sessions. In addition, if the UE 115 application provides a DNN, UE 115 may determine which PDU session to use. In some cases, if UE 115 does not have a PDU session established and associated with the S-NSSAI, UE 115 may request a new PDU session associated with the S-NSSAI and with a DNN that may be provided by the application. In order for the network to select a proper resource for supporting network slicing in the RAN, RAN needs to be aware of the network slices used by the UE 115. An AMF may select an SMF in a network slice instance based on S-NSSAI, DNN and other information; for example, UE subscription and local operator policies, when the UE triggers the establishment of a PDU session. The selected SMF establishes a PDU session based on S-NSSAI and DNN.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
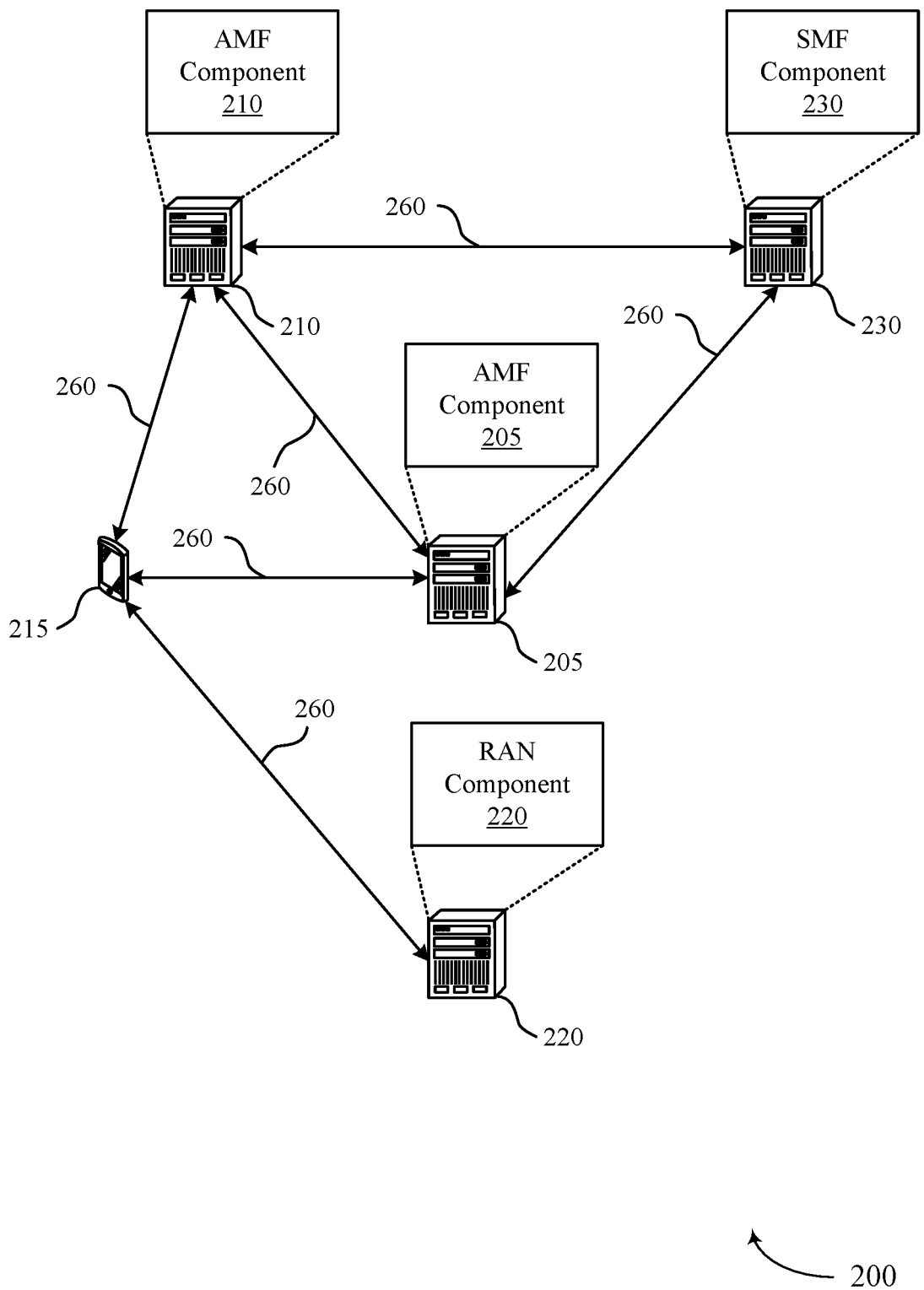

FIG. 2 illustrates a wireless communications system 200 that supports enabling a network-trigger change of network slices in accordance with one or more aspects of the present disclosure. In some examples, wireless communications system 200 may implement aspects of wireless communications system 100. Wireless communications system 200 may support network slicing. In some cases, access to network slicing may be based on a subscription and network deployment options; for example, some AMFs may not support all network slices requested by a UE. In addition, there may be isolated AMFs for some network slice(s) that do not support other network slices, and may be reached by other AMFs that support the same network slice. Wireless communications system 200 may perform de-registration with re-registration for isolated network slices, and assign parameters in order to enable a selection of an appropriate AMF. In addition, for non-isolated network slices, an AMF relocation procedure may be triggered by a current AMF, to the new AMF.

The wireless communications system 200 may include UE 215, that may be examples of UE 115 as described with reference to FIG. 1. The wireless communications system 200 may also include AMF component 205, AMF component 210, RAN component 220, and SMF component 230. AMF component 205, AMF component 210, and AMF component 210 may be located locally or remote from a base station or core network such as base stations 105 or core network 130, as described with reference to FIG. 1.

UE 215 may establish a session with one or more network slices (not shown). In some examples, the session may include multiple PDU sessions associated with multiple network slices. A PDU session may be an association between UE 215 and a data network (e.g., AMF component 205 or AMF component 210) that provides a PDU connectivity service. In some cases, the association may be an IP, an Ethernet, or unstructured type. The PDU connectivity service may be a service that exchanges PDUs between UE 215 and a data network (e.g., RAN component 220). Communication links 260 shown in wireless communications system 200 may include UL transmissions from UE 215 to one or more network entities (e.g., AMF component 205, AMF component 210, RAN component 220, and SMF component 230), or DL transmissions, from one or more of the network entities (e.g., AMF component 205, AMF component 210, RAN component 220, and SMF component 230) to UE 215.

AMF component 205 may be a current AMF serving network slices used by UE 215. These network slices may be associated with a current-allowed NSSAI. NSSAI may include parameters to assist selection of a RAN and a core network for a network slice instance used by UE 215. In some cases, a single NSSAI may be associated with multiple network slices. In some cases, the network may also select a RAN and a core network based on UE 215 capabilities and subscription information. Additionally, NSSAI may include a session management NSSAI. The session management NSSAI may include a network slice service type or a network slice identifier (ID), or both. The network slice service type may identify features and services supported by a network slice.

A network may trigger a change to the current-allowed NSSAI. For example, the network may change a parameter associated with a capability of a network slice. That is, a network slice may change capabilities for servicing a subscription. In some cases, due to the change of the network slice(s), UE 215 may deregister with a current AMF and register with a new AMF. In other cases, due to the change of the network slice(s), the network may initiate redirection of network connectivity through a serving AMF.

According to a first technique, AMF component 205 may trigger AMF relocation. AMF relocation may include triggering the UE 215 to change to a new AMF. In some cases, AMF component 205 may receive a new-allowed NSSAI based on a change to the current-allowed NSSAI. For example, AMF component 205 may determine that a current-allowed NSSAI for UE 215 may require modification based on a network trigger including at least a PCF indication or a subscription change. AMF component 205 may determine to modify a current-allowed network slice used by UE 215 based on the new-allowed NSSAI. As such, AMF component 205 may modify the current-allowed NSSAI used by UE 215.

AMF component 205 may select a new AMF based on the new-allowed NSSAI. For example, AMF component 205 may select AMF component 210 as the new AMF. In some cases, AMF component 205 may also determine that UE 215 has an active network slice instance (NSI) associated with an NSSAI of a current-allowed S-NSSAI. In some cases, AMF component 205 may determine whether UE 215 has one or more NSI active for any of the S-NSSAIs that belong to the current-allowed NSSAI, and that are not in the new-allowed NSSAI. That is, AMF component 205 may identify that an active NSI supported in the current-allowed NSSAI associated with UE 215 is supported in the new-allowed NSSAI. AMF component 205 may generate a status report. In some cases, the status report may be UE context. The UE context may include a status of all existing UE PDU sessions associated with an active NSI. AMF component may transmit the status report to AMF component 210.

In some cases, AMF component 205 may trigger AMF relocation due to a change of supported NSSAIs in the received new-allowed NSSAI. AMF component 205 may transmit an AMF relocation request to AMF component 210 via communication link 260. The AMF relocation request may include the new-allowed NSSAI and the status report. In this case, the status report may include the UE PDU status of all the UE sessions corresponding to S-NSSAIs in the new-allowed NSSAI. Additionally or alternatively, the status report may include current NR GUTI. AMF component 205 may trigger a release procedure, in some cases. The release procedure may be triggered based on direct signaling to UE 215. The release procedure may be a PDU release procedure for each active PDU session that is not supported in the new-allowed NSSAI. Similarly, the AMF component 205 may trigger the release procedure to AMF component 210 via communication link 260.

According to a second technique, RAN component 220 may determine a change in NSSAI for UE 215 and trigger AMF relocation. RAN component 220 may determine a new-allowed NSSAI based on a change to the current-allowed NSSAI. For example, RAN component 220 may determine that a current-allowed NSSAI for UE 215 may require modification based on a network trigger including at least a PCF indication or an indication designating a change in a subscription of a network slice. RAN component 220 may determine to modify a current-allowed network slice used by UE 215 based on the new-allowed NSSAI. As such, RAN component 220 may modify the current-allowed NSSAI used by UE 215.

RAN component 220 may select a new AMF based on the new-allowed NSSAI. For example, RAN component 220 may select AMF component 210 as the new AMF. RAN component 220 may then trigger AMF relocation due to a change of supported NSSAIs in the received new-allowed NSSAI. RAN component 220 may transmit an AMF relocation request to AMF component 210 via communication link 260. The AMF relocation request may include the new-allowed NSSAI and the status report. In this case, the status report may include the UE PDU status of all the UE sessions corresponding to S-NSSAIs in the new-allowed NSSAI. Additionally or alternatively, the status report may include a current NR GUTI. AMF component 210 may receive the status report and provide a response including an updated NR GUTI for UE 215.

At least one of AMF component 210 and RAN component 220 may transmit an indication identifying a change in AMF (e.g., change from AMF component 205 to AMF component 210) for network slices associated with the new-allowed NSSAI, to SMF component 230. These network slices may be associated with an active PDU session(s). In some examples, the network slices may be associated with a same or different SMF component 230. As a result, AMF component 210 may transmit the indication to multiple SMF components (not shown). In some cases, AMF component 210 may determine and allocate a NR (e.g., or other 5G network identifier) GUTI for UE 215. The UE 215 may receive the NR GUTI from AMF component 210 in a message; for example, in a UE configuration request message via communication links 260. The message may also include a UE PDU session status report (e.g., associated with UE context) provided by AMF component 205 or the new-allowed NSSAI, or both.

The message may, alternatively, be an IKEv2 INFORMATIONAL message. This message may be identified by an exchange type value set to a predetermined number (e.g., 37), or a new reconfiguration signaling connection message identified by an exchange type value set between a predetermined range (e.g., a value between 240 and 255) that may be reserved for private use. In some examples, the NSSAI request, the cause code indicating a signaling path reconfiguration, or the GUTI, or a combination thereof may be included in a generic payload with a payload type set to a predetermined number (e.g., 43) to indicate a vendor ID payload.

Upon receiving the message from AMF component 210, UE 215 may store the new-allowed NSSAI, the new NR GUTI and releases active PDU sessions that are absent in the UE PDU session status report. In some cases, UE 215 may determine that a number of additional network slices are required in addition to the network slices included in the new-allowed NSSAI. In other words, the number of additional network slices may have not been supported in the previous allowed NSSAI. UE 215 may re-register with a network (e.g., base station) based on determining that additional network slices are assigned. For example, in the previous allowed NSSAI, UE 215 may have been assigned network slices 1, 2, and 3; however, in the new-allowed NSSAI, the UE may be assigned network slices 1, 4, and 5. As such, the UE may determine that network slices 4 and 5 are newly supported. As part of re-registering with the network, UE 215 may transmit an NSSAI request. The NSSAI request may include the additional network slice(s) (e.g., network slices 4 and 5) and the currently registered network slices. As such, the UE may determine that network slice 4 needs to be registered. As part of re-registering with the network, the UE may transmit an NSSAI request.

In some examples, during a registration procedure in wireless communications system 200, RAN component 220 may determine that UE 215 should be served by a different AMF (e.g., AMF Component 210 instead of AMF component 205) based on network slices identified in a new-allowed NSSAI. In some cases, AMF component 205 may receive a registration request from RAN component 220. In the case that RAN component 220 determines that aspects of the network slices identified in the new-allowed NSSAI should be served by AMF component 210, RAN component 220 may trigger an AMF relocation based in part on the new-allowed NSSAI. RAN component 220 may signal AMF component 205 to redirect the registration request to AMF component 210. Redirecting the request from AMF component 205 may include transmitting a redirect message and the transmission may be via the RAN component 220 or via direct signaling between AMF component 205 and AMF component 210 (e.g., via communication links 260). In some cases, the redirect message transmitted by AMF component 205 via the RAN component 220 may include information for selection of a new AMF to serve the UE 215.

According to a second technique, a network may trigger a de-registration procedure. In some cases, the second technique may apply when a new set of allowed network slices do not overlap with previous set of allowed network slices. Similarly, AMF component 205 may be a current AMF serving network slices used by UE 215. These network slices may be associated with a current-allowed NSSAI. AMF component 205 may receive a new-allowed NSSAI based on a change to the current-allowed NSSAI. In some cases, AMF component 205 may determine to modify a current-allowed network slice used by UE 215 based on the new-allowed NSSAI. As such, AMF component 205 may modify the current-allowed NSSAI used by UE 215.

AMF component 205 may select a new AMF based on the new-allowed NSSAI. In some cases, AMF component 205 may determine that no new AMF can be selected or that the new AMF is not reachable by AMF component 205. In this case, AMF component 205 (i.e., the current AMF) may transmit a de-registration request to UE 215. The de-registration request may include an indication to perform a re-registration procedure, the new-allowed NSSAI, or a code indicating that the de-registration is in response to a change of supported network slices in the new-allowed NSSAI, or a combination thereof.

AMF component 205 may refrain from releasing an N2 signaling connection until AMF component 205 receives a request from RAN component 220. In some cases, RAN component 220 may transmit a request to AMF component 205 to release the N2 signaling connection via communication link 260. In response to receiving the request from RAN component 220, AMF component 205 may trigger a release procedure. The release procedure may be a PDU release procedure for each active PDU session associated with an S-NSSAI that is unsupported in the new-allowed NSSAI. In some examples, when all the active PDU sessions are released, AMF component 205 may release UE context to AMF component 210.

Returning to the case that AMF component 205 transmits the de-registration request to UE 215, UE 215 may determine that the request is provided by AMF component 205 and that the request includes a code indicating that the de-registration request is in response to a change of supported network slices in the new-allowed NSSAI. Additionally, UE 215 may identify the new-allowed NSSAI based on the received de-registration request. In some cases, UE 215 may store the new-allowed NSSAI locally or remotely, or both. UE 215 may also determine to which network slices in the received new-allowed NSSAI to connect. Based on determining which network slices to connect to, UE 215 may generate a NSSAI request identifying the network slices. UE 215 may transmit the NSSAI request to AMF component 205 or AMF component 210, or both.

UE 215 may also perform operations based on the received code with de-registration request. UE 215 may remove a current NR GUTI based on the received code. Additionally or alternatively, an upper layer of UE 215 may transmit to a lower layer of the UE 215: an indication to release a connection with RAN component 220 and to re-establish the connection, or the NSSAI request, or an indication to refrain from providing a NR GUTI, or a combination thereof. In some examples, the upper layer may be a NAS layer and the lower layer be an AS layer. In some cases, UE 215 may transmit a request to re-establish the connection based on the indication to re-establish the connection, where the request includes the NSSAI request. In some examples, the connection may be a RRC connection. In this case, UE 215 may perform a RRC connection release procedure or an RRC connection establishment procedure, or both based on the indication to release a connection with RAN component 220 and to re-establish the connection. Alternatively, the connection may be an IP security (IPsec) tunnel connection. In this case, UE 215 may perform an IPsec tunnel release procedure or an IPsec tunnel establishment procedure, or both based on the indication to release a connection with a RAN and to re-establish the connection.

In some cases, the upper layer of UE 215 may transmit to the lower layer of the UE 215 to modify a connection with RAN component 220, and provided the NSSAI request. UE 215 may transmit a new RRC reconfiguration request message including the NSSAI request, or a code indicating signaling path configuration, or a current NR GUTI, or a combination thereof. Alternatively, UE 215 may transmit a Nwu message including the NSSAI request, or the code indicating signaling path configuration, or the current NR GUTI, or a combination thereof. In some examples, UE 215 may include a NAS registration request message in the RRC message, providing the NSSAI request.

RAN component 220 may receive a RRC request message including the NSSAI request from UE 215. According to one technique, RAN component 220 may select AMF component 210 as a target AMF to serve UE 215 based on the NSSAI received in the RRC request message. A connection between the RAN component 220 and the AMF component 210 may be established based on the selecting the AMF component 210 to serve UE 215. For example, RAN component 220 and AMF component 210 may establish a connection via communication links 260. In some examples, as part of establishing the connection with the AMF component 210, RAN component 220 may transmit the received NAS message from UE 215 to AMF component 210. Additionally, the established connection between AMF component 210 and RAN component 220 may be an N2 signaling connection.

According to another technique, RAN component 220 may select AMF component 210 as a target AMF to serve UE 215 based on the NSSAI received in the RRC request message, and establish a connection with AMF component 210 via communication links 260. In some cases, RAN component 220 may transmit to AMF component 205 (e.g., now previous AMF) a request to release a connection; for example, an N2 signaling connection between AMF component 205 and RAN component 220 or UE 215, or both. In some cases, RAN component 220 may receive, from AMF component 210, an updated NR GUTI for the UE 215, and replace a previous NR GUTI with the received updated NR GUTI for the UE 215. RAN component 220 may transmit feedback (e.g., results) of the registration with AMF component 210 to UE 215. For example, the feedback may include the updated NR GUTI and an indication that AMF component 210 is a new serving AMF for UE 215 for network slices associated with the new-allowed NSSAI.

Figure 3:
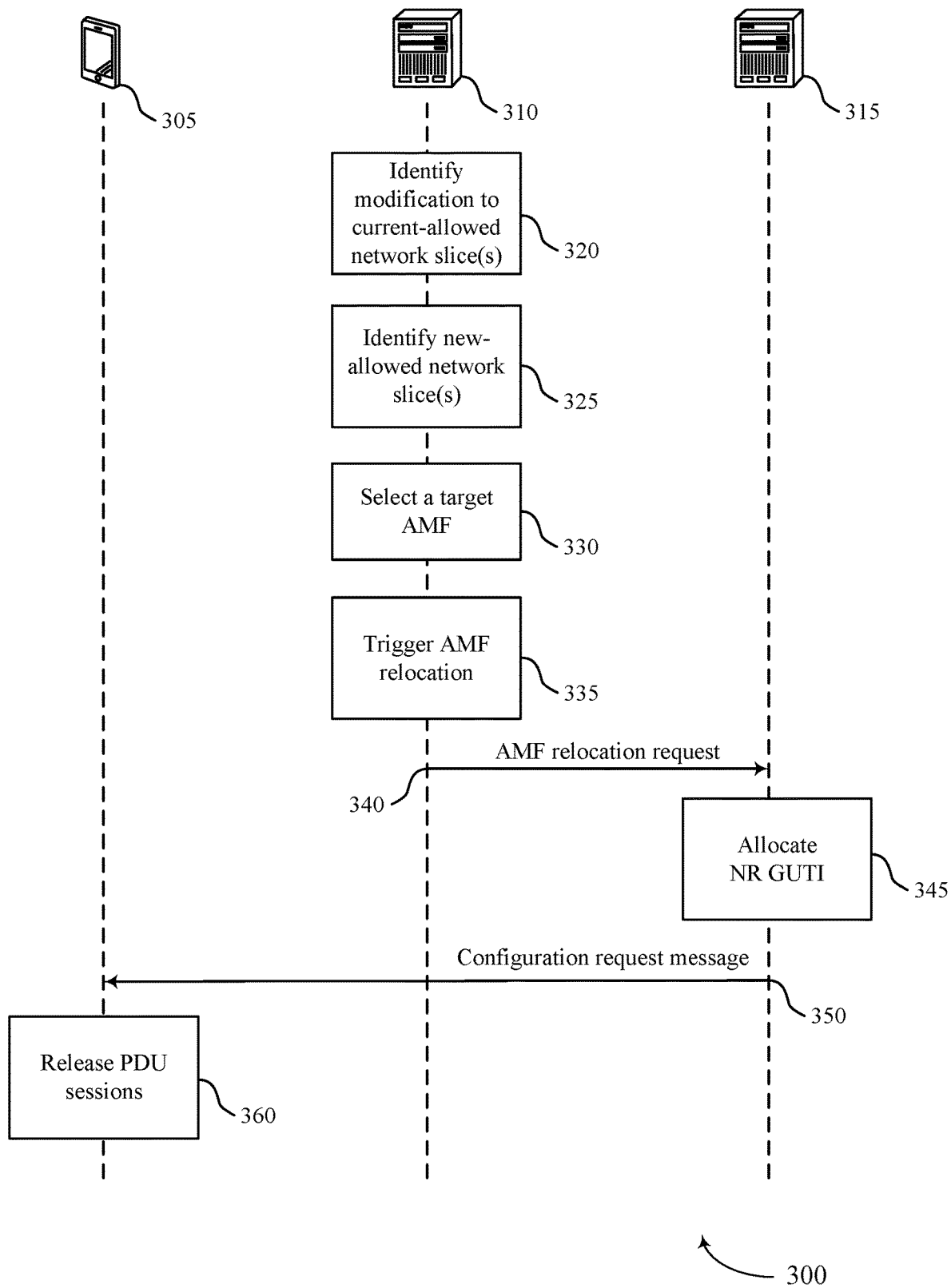
FIGS. 3 and 4 illustrate examples of a process flow that supports enabling a network-trigger change of network slices, in accordance with one or more aspects of the present disclosure.

FIG. 3 illustrates an example of a process flow 300 that supports enabling a network-trigger change of network slices, in accordance with one or more aspects of the present disclosure. In some examples, process flow 300 may implement aspects of wireless communications system 100 and 200. UE 305 may be an example of aspects of a respective one of the UEs 115 described with reference to FIG. 1 or 2. AMF component 310, and AMF component 315 may be an example of aspects of a respective one of the AMF components described with reference to FIG. 2.

In the following description of the process flow 300, the operations between UE 305, AMF component 310, or AMF component 315 may be transmitted in a different order than the exemplary order shown, or the operations performed by UE 305, AMF component 310, or AMF component 315 may be performed in different orders or at different times. Certain operations may also be left out of the process flow 300, or other operations may be added to the process flow 300.

At 320, AMF component 310 may identify a request to modify current-allowed network slice supported by UE 305 based on a network-trigger. At 325, AMF component 310 may identify new-allowed network slices for the UE 305. At 330, AMF component 310 may select a target AMF. In some examples, AMF component 310 may select the target AMF based on the new-allowed network slices, where the target AMF is accessible by the source AMF. In some cases, AMF component 310 may determine that UE 305 has an NSI associated with at least one NSSAI of a current-allowed S-NSSAI, and identify that an active NSI is supported in the new-allowed network slices. At 335, AMF component 310 may trigger an AMF relocation. In some examples, AMF component 310 may trigger the AMF relocation based on selecting the target AMF. AMF component 310 may transmit AMF relocation request, at 340 to AMF component 315.

At 345, AMF component 315 may allocate a NR GUTI. For example, AMF component 315 may allocate the NR GUTI for the UE 305 based on the triggered AMF relocation. At 350, AMF component 315 may transmit to UE 305 a configuration request message. The configuration request message may include the NR GUTI, an updated status of an existing UE PDU session (or multiple existing UE PDU sessions), or the new-allowed network slices, or a combination thereof. In some cases, the NR GUTI may be a modified version of a previous NR GUTI assigned to UE 305.

At 355, UE 305 may release PDU sessions. In some cases, UE 305 may receive, from AMF component 310, the configuration message including the NR GUTI associated with AMF component 315, a status of an existing active PDU session of the UE 305, or new-allowed network slices, or a combination thereof. UE 305 may store information associated with the new-allowed network slices and NR GUTI. UE 305 may also identify an active PDU session based on the status of existing active PDU session information included in the configuration message, the identified active PDU session may be unsupported by the new-allowed network slices. As a result, UE 305 may locally release the identified PDU session. In some cases, UE 305 may identify local UE PDU session status for one or more active PDU sessions. In addition, UE 305 may receive the updated status associated with UE PDU sessions. UE 305 may release the PDU sessions that were supported in the local UE PDU session status, but are not supported in the received updated status. For example, UE 305 may compare the local UE PDU session status with the received updated status. Based on the comparison UE 305 may identify a change in UE PDU sessions. That is, UE 305 may identify that some or all PDU sessions associated with the local UE PDU session status are no longer supported in the received updated status. In this case, UE 305 may release the PDU sessions that are no longer supported. In addition, the PDU sessions that are no longer supported may have already been released by the network.

Figure 4:
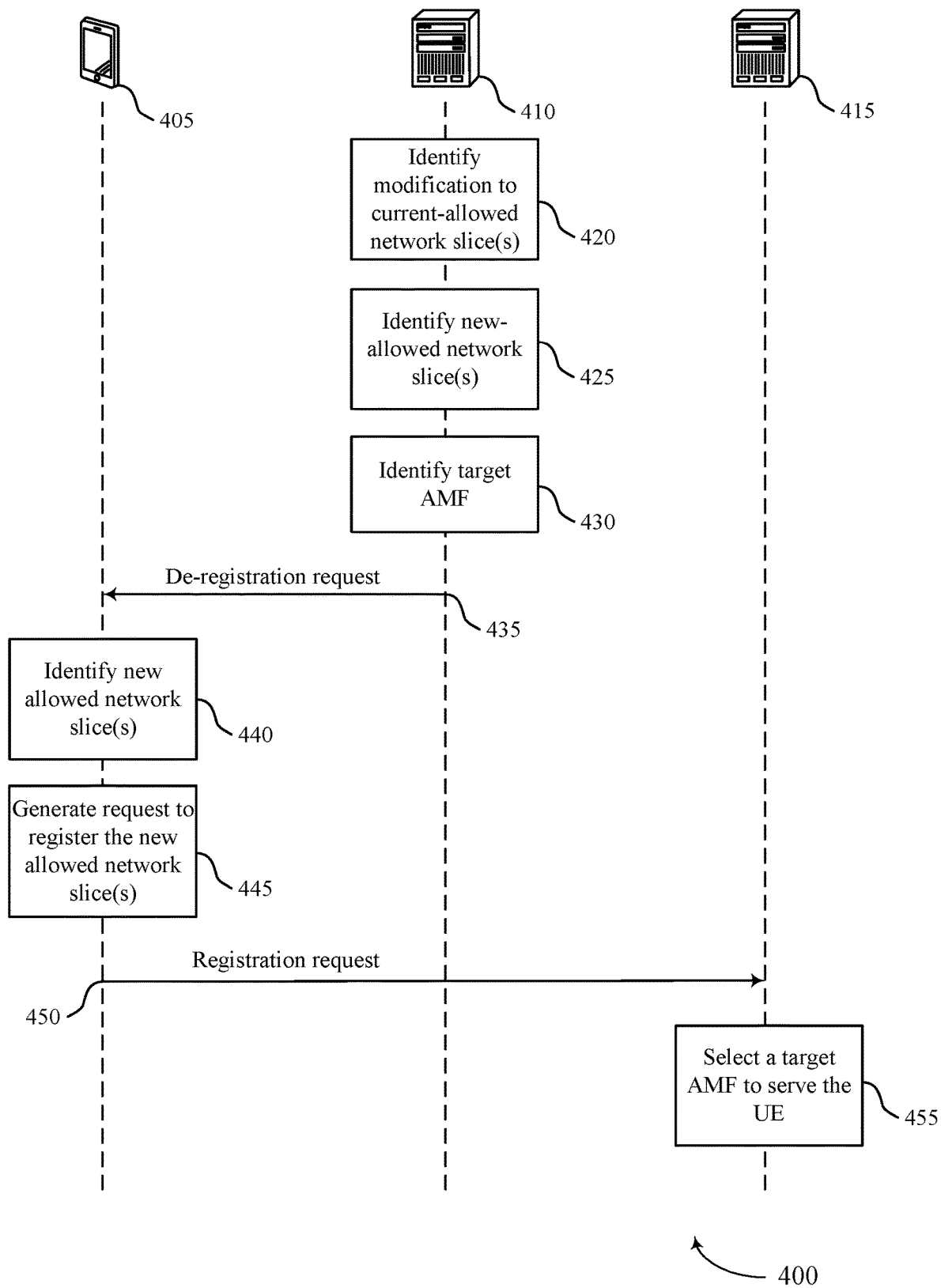

FIG. 4 illustrates an example of a process flow 400 that supports enabling a network-trigger change of network slices, in accordance with one or more aspects of the present disclosure. In some examples, process flow 400 may implement aspects of wireless communications system 100 and 200. UE 405 may be an example of aspects of a respective one of the UEs 115 described with reference to FIGS. 1 through 3. AMF component 410, and RAN component 415 may be an example of aspects of a respective one of the AMF components and RAN component described with reference to FIG. 2.

In the following description of the process flow 400, the operations between UE 405, AMF component 410, or RAN component 415 may be transmitted in a different order than the exemplary order shown, or the operations performed by UE 405, AMF component 410, or RAN component 415 may be performed in different orders or at different times. Certain operations may also be left out of the process flow 400, or other operations may be added to the process flow 400.

At 420, AMF component 410 may identify to modify current-allowed network slice(s), used by UE 405 based on a network-trigger. At 425, AMF component 410 may identify new-allowed network slice(s), for the UE 405. At 430, AMF component 410 may identify a target AMF based on the new-allowed network slices. In some cases, AMF component 410 may determine that the target AMF associated with the new-allowed network slices is inaccessible by AMF component 410. Alternatively, AMF component 410 may determine that the target AMF associated with the new-allowed network slices is accessible by AMF component 410. Additionally, AMF component may determine that no new AMF can be selected. At 435, AMF component 410 may transmit a de-registration request to the UE 405. In some cases, AMF component 410 may transmit the de-registration request to UE 405 based on determining that the target AMF is inaccessible or that no target AMF can be selected, by the AMF component 410. The de-registration request may include an indication to perform a re-registration procedure, the identified new-allowed network slices, or a code indicating that the de-registration request is in response to a change of supported network slices, or a combination thereof.

At 440, UE 405 may identify new-allowed network slice(s). In some cases, UE 405 may identify new-allowed network slice(s) based on the received de-registration request. At 445, UE 405 may generate a request for registering the set of network slices. UE 405 may, in some cases, generate the request for registering the set of network slices based on the code. At 450, UE 405 transmits a registration request. UE 405 may transmit the registration request to register the new-allowed network slice(s) to RAN component 415. In some examples, based on the code, UE 405 may transmit the request without providing a GUTI to RAN component 415. At 455, RAN component 415 may select a target AMF to serve UE 405. In some cases, RAN component 415 may select a target AMF to server UE 405 based on the registration request.

Figure 5:
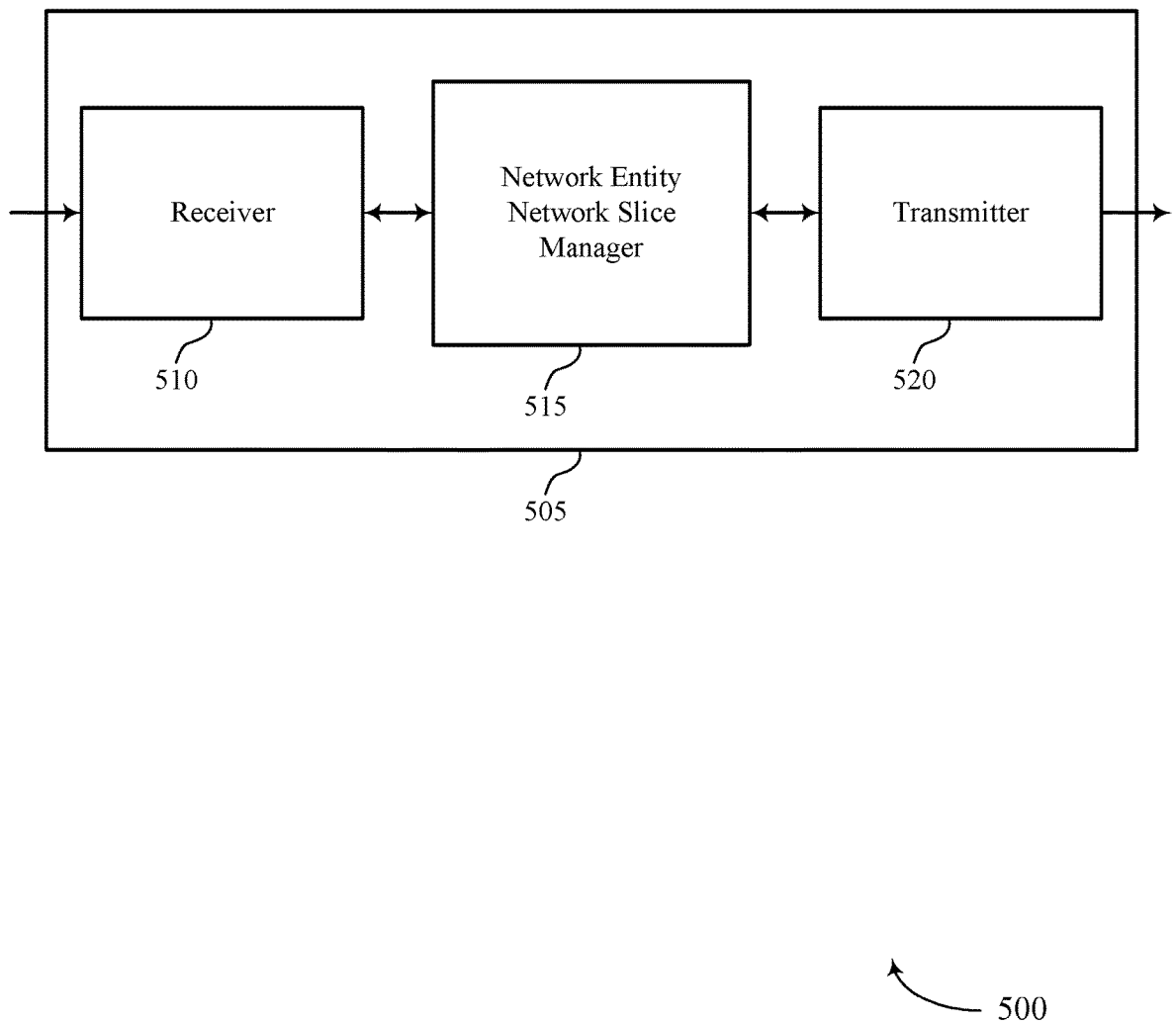
FIGS. 5 through 7 show block diagrams of a device that supports enabling a network-trigger change of network slices, in accordance with one or more aspects of the present disclosure.

FIG. 5 shows a block diagram 500 of a wireless device 505 that supports enabling a network-trigger change of network slices, in accordance with one or more aspects of the present disclosure. Wireless device 505 may be an example of aspects of a network entity AMF as described herein. Wireless device 505 may include receiver 510, network entity network slice manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to enable a network-trigger change of network slices, etc.). Information may be passed on to other components of the device. The receiver 510 may be an example of aspects of the transceiver 835 described with reference to FIG. 8. The receiver 510 may utilize a single antenna or a set of antennas.

Network entity network slice manager 515 may be an example of aspects of the network entity network slice manager 815 described with reference to FIG. 8.

Network entity network slice manager 515 and/or at least some of its various sub-components may be implemented in hardware, software executed by a processor, firmware, or any combination thereof. If implemented in software executed by a processor, the functions of the network entity network slice manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The network entity network slice manager 515 and/or at least some of its various sub-components may be physically located at various positions, including being distributed such that portions of functions are implemented at different physical locations by one or more physical devices. In some examples, network entity network slice manager 515 and/or at least some of its various sub-components may be a separate and distinct component in accordance with various aspects of the present disclosure. In other examples, network entity network slice manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Network entity network slice manager 515 may determine to modify current-allowed network slices used by a UE based on a network-trigger, identify new-allowed network slices for the UE based on the determining, select a target AMF based on the new-allowed network slices, where the target AMF is accessible by the source AMF, and trigger an AMF relocation based on the selecting. The network entity network slice manager 515 may also receive, from a source AMF, an AMF relocation request for a UE currently served by the source AMF. The AMF relocation request may include new-allowed network slices and UE context information. The network entity network slice manager 515 may allocate an updated GUTI for the UE based on the AMF relocation request, and transmit to the UE a configuration request message including the updated NR GUTI, an updated status of an existing PDU session, or the new-allowed NSSAI, or a combination thereof.

The network entity network slice manager 515 may also determine to modify current-allowed network slice used by a UE based on a received network-trigger, identify new-allowed network slices for the UE based on the determining, and determine that a target AMF associated with the new-allowed network slices is inaccessible by the source AMF. The network entity network slice manager 515 may also receive, from a UE a RRC connection request including NSSAI, select a target AMF to serve the UE based on the NSSAI received in the RRC connection request, establish an N2 signaling connection with the selected AMF, and transmit a NAS message received from the UE to the selected AMF using the N2 signaling connection.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

It should be noted that the methods described above describe possible implementations, and that the operations and the blocks may be rearranged or otherwise modified and that other implementations are possible. Furthermore, aspects from two or more of the methods may be combined.

Figure 6:
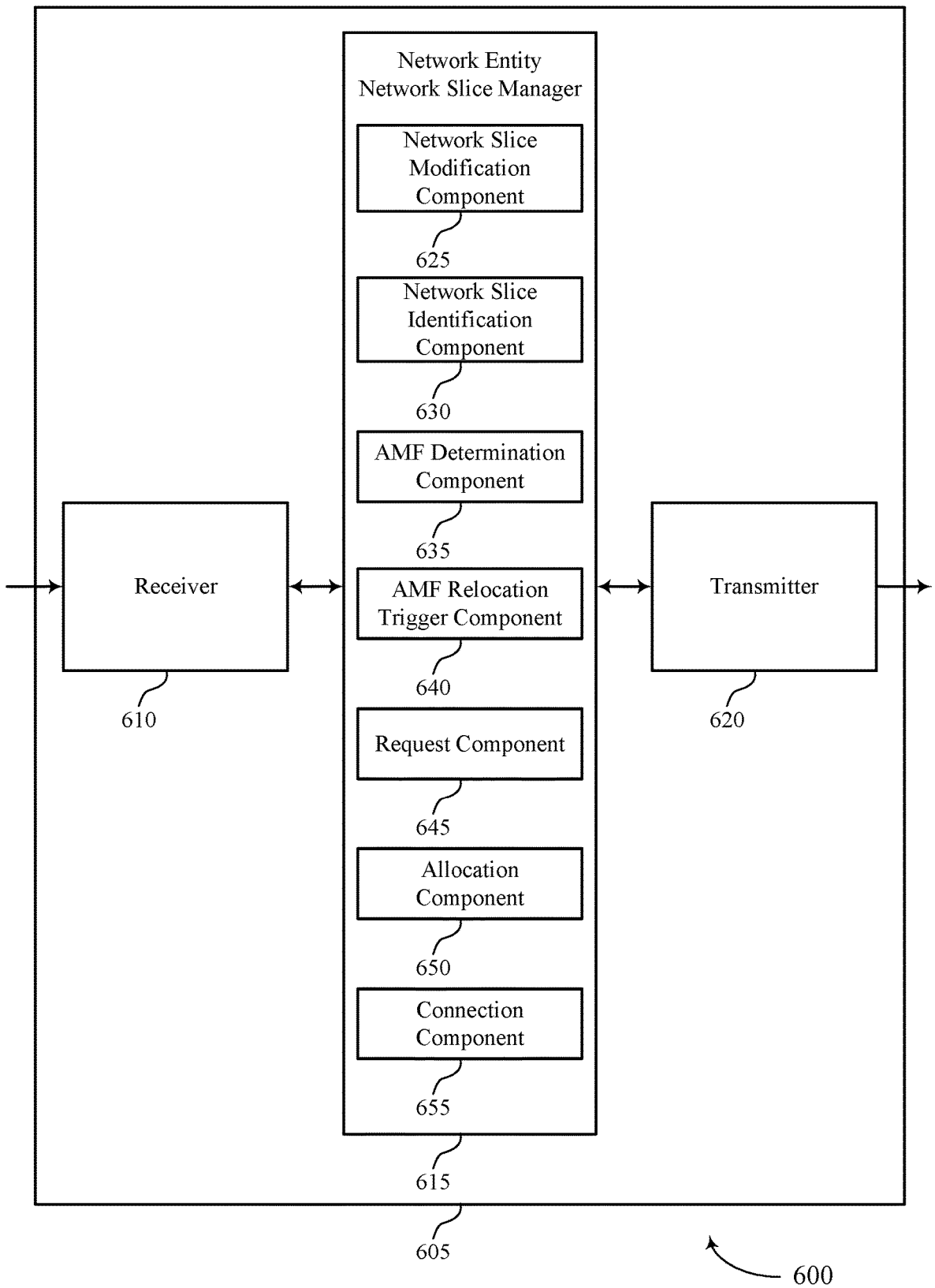

FIG. 6 shows a block diagram 600 of a wireless device 605 that supports enabling a network-trigger change of network slices, in accordance with one or more aspects of the present disclosure. Wireless device 605 may be an example of aspects of a wireless device 505 or an AMF as described with reference to FIG. 5. Wireless device 605 may include receiver 610, network entity network slice manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to enabling a network-trigger change of network slices, etc.). Information may be passed on to other components of the device. The receiver 610 may be an example of aspects of the transceiver 835 described with reference to FIG. 8. The receiver 610 may utilize a single antenna or a set of antennas.

Network entity network slice manager 615 may be an example of aspects of the network entity network slice manager 815 described with reference to FIG. 8. Network entity network slice manager 615 may also include network slice modification component 625, network slice identification component 630, AMF determination component 635, AMF relocation trigger component 640, request component 645, allocation component 650, and connection component 655.

Network slice modification component 625 may determine to modify current-allowed network slices used by a UE based on a network-trigger and determine to modify current-allowed network slice used by a UE based on a received network-trigger. Network slice identification component 630 may identify new-allowed network slices for the UE based on the determining, determine that the UE has an active network slice instance (NSI) associated with at least one network selection assistance information (NSSAI), and identify that an active NSI is supported by the new-allowed network slices.

AMF determination component 635 may select a target AMF based on the new-allowed network slices, where the target AMF is accessible by the source AMF. The AMF determination component 635 may determine that a target AMF associated with the new-allowed network slices is inaccessible by the source AMF, and transmit a de-registration request to the UE based on determining that the target AMF is inaccessible by the source AMF. The AMF determination component 635 may select a target AMF to serve the UE based on the NSSAI received in the RRC connection request. The AMF determination component 635 may receive, from the selected AMF, an updated NR GUTI for the UE, and replace a previous NR GUTI with the received updated NR GUTI for the UE. In some cases, the de-registration request includes an indication to perform a re-registration procedure, the identified new-allowed network slices, or a code indicating that the de-registration request is in response to a change of supported network slices, or a combination thereof.

AMF relocation trigger component 640 may trigger an AMF relocation based on the selecting and transmit an AMF relocation request to the target AMF based on the new-allowed NSSAI, where the AMF relocation request includes a status of all existing PDU session associated with the active NSI that are supported and active, or a NR globally unique temporary identifier (GUTI), or both.

Request component 645 may receive, from a source AMF, an AMF relocation request for a UE currently served by the source AMF, the AMF relocation request including new-allowed network slices and UE context information. Request component 645 may transmit to the UE a configuration request message including the updated NR GUTI, an updated status of an existing PDU session, or the new-allowed NSSAI, or a combination thereof, and receive, from a UE a RRC connection request including NSSAI. In some cases, the UE context information includes a status of an existing PDU session associated with an active NSI or a current NR GUTI, or a combination thereof. Allocation component 650 may allocate an updated NR GUTI for the UE based on the AMF relocation request.

Connection component 655 may establish an N2 signaling connection with the selected AMF, transmit a NAS message received from the UE to the selected AMF using the N2 signaling connection, and transmit, to a previous serving AMF of the UE, a request to release an N2 signaling connection.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
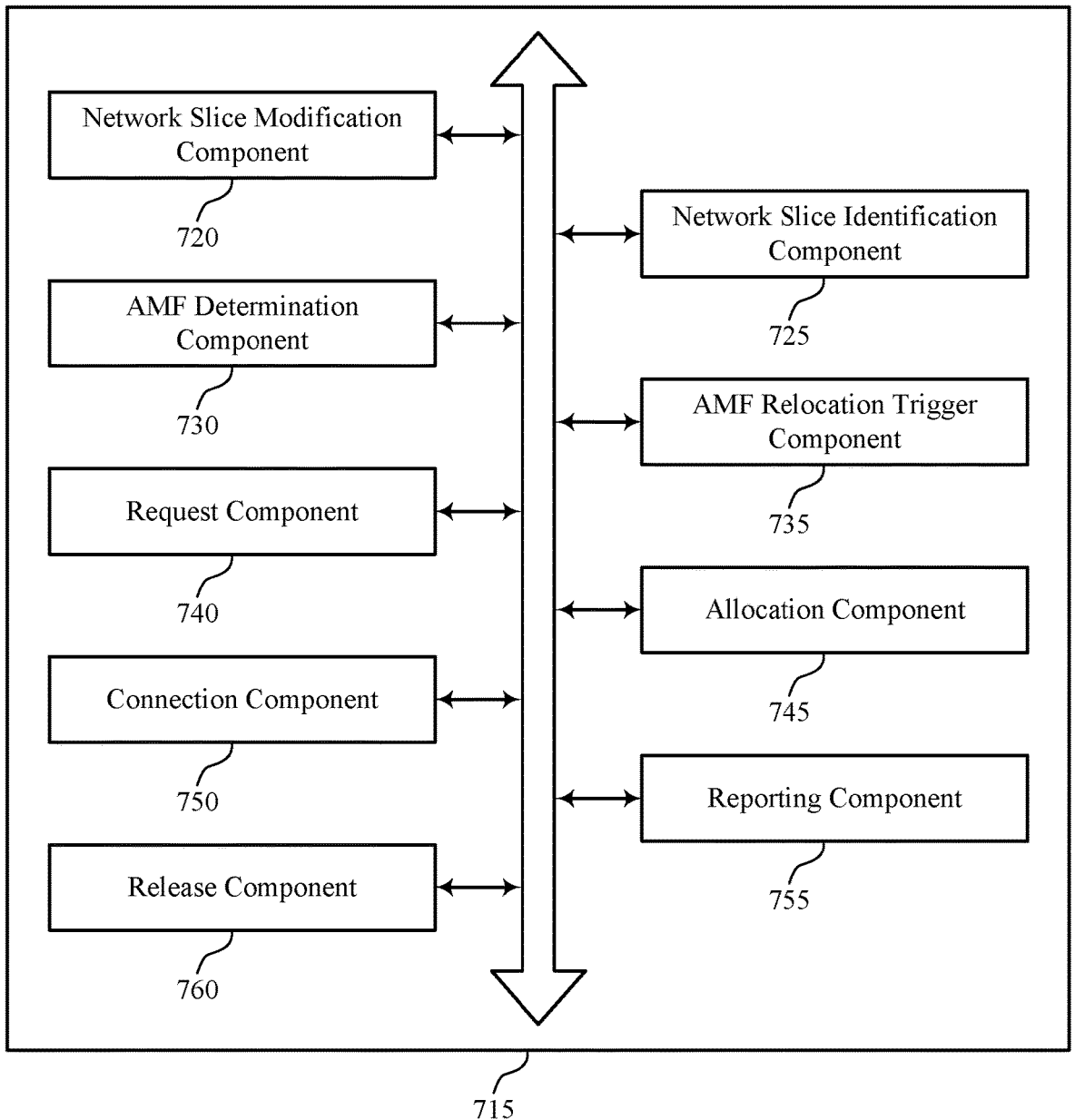

FIG. 7 shows a block diagram 700 of a network entity network slice manager 715 that supports enabling a network-trigger change of network slices in accordance with one or more aspects of the present disclosure. The network entity network slice manager 715 may be an example of aspects of a network entity network slice manager 515, a network entity network slice manager 615, or a network entity network slice manager 815 described with reference to FIGS. 5, 6, and 8. The network entity network slice manager 715 may include network slice modification component 720, network slice identification component 725, AMF determination component 730, AMF relocation trigger component 735, request component 740, allocation component 745, connection component 750, reporting component 755, and release component 760. Each of these modules may communicate, directly or indirectly, with one another (e.g., via one or more buses).

Network slice modification component 720 may determine to modify current-allowed network slices used by a UE based on a network-trigger and determine to modify current-allowed network slice used by a UE based on a received network-trigger.

Network slice identification component 725 may identify new-allowed network slices for the UE based on the determining, determine that the UE has an active network slice instance (NSI) associated with at least one network selection assistance information (NSSAI), and identify that an active NSI is supported by the new-allowed network slices.

AMF determination component 730 may select a target AMF based on the new-allowed network slices, where the target AMF is accessible by the source AMF, determine that a target AMF associated with the new-allowed network slices is inaccessible by the source AMF, and transmit a de-registration request to the UE based on determining that the target AMF is inaccessible by the source AMF. AMF determination component 730 may select a target AMF to serve the UE based on the NSSAI received in the RRC connection request. AMF determination component 730 may receive, from the selected AMF, an updated NR GUTI for the UE, and replace a previous NR GUTI with the received updated NR GUTI for the UE. In some cases, the de-registration request includes an indication to perform a re-registration procedure, the identified new-allowed network slices, or a code indicating that the de-registration request is in response to a change of supported network slices, or a combination thereof.

AMF relocation trigger component 735 may trigger an AMF relocation based on the selecting and transmit an AMF relocation request to the target AMF based on the new-allowed NSSAI, where the AMF relocation request includes a status of all existing PDU session associated with the active NSI that are supported and active, or a NR GUTI, or both.

Request component 740 may receive, from a source AMF, an AMF relocation request for a UE currently served by the source AMF, the AMF relocation request including new-allowed network slices and UE context information, and transmit to the UE a configuration request message including the updated NR GUTI, an updated status of an existing PDU session, or the new-allowed NSSAI, or a combination thereof. Request component 740 may receive, from a UE, a RRC connection request including NSSAI. In some cases, the UE context information includes a status of an existing PDU session associated with an active NSI or a current NR GUTI, or a combination thereof.

Allocation component 745 may allocate an updated NR GUTI for the UE based on the AMF relocation request. Connection component 750 may establish an N2 signaling connection with the selected AMF, transmit a NAS message received from the UE to the selected AMF using the N2 signaling connection, and transmit, to a previous serving AMF of the UE, a request to release an N2 signaling connection. Reporting component 755 may generate a status report indicating a status of all existing PDU sessions associated with the active NSI.

Release component 760 may trigger a release procedure of an active PDU session associated with the current-allowed network slices based on identifying that the active PDU session is not supported by the new-allowed network slices, trigger a release procedure of an active PDU session associated with current-allowed network slices that are unsupported by the new-allowed network slices, and release UE context including a status report of active PDU session or a NR GUTI, or both based on the triggering. In some cases, the triggering the release procedure based on direct signaling to the UE.

Figure 8:
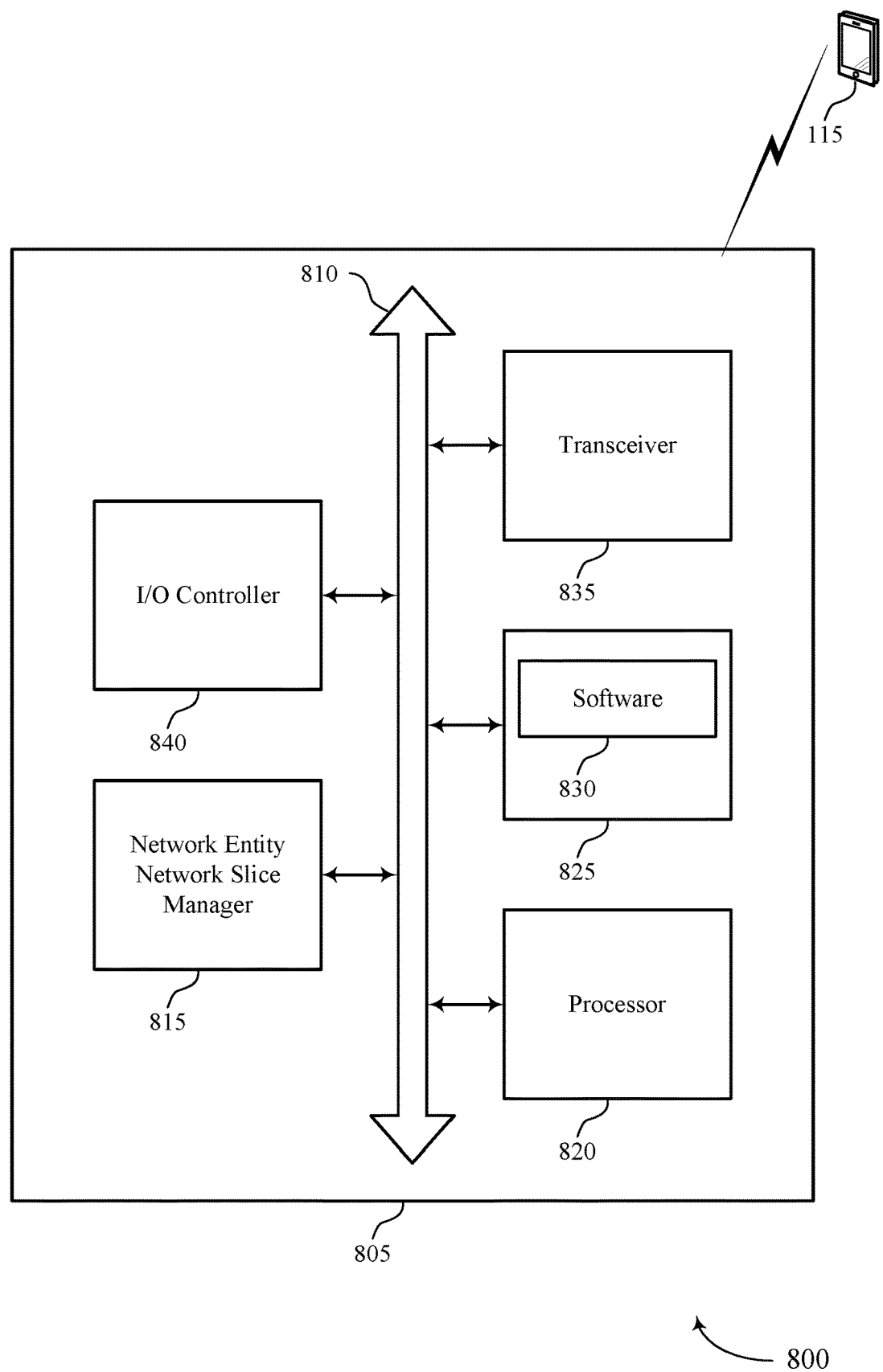
FIG. 8 illustrates a block diagram of a system including a network entity that supports enabling a network-trigger change of network slices, in accordance with one or more aspects of the present disclosure.

FIG. 8 shows a diagram of a system 800 including a device 805 that supports enabling a network-trigger change of network slices, in accordance with one or more aspects of the present disclosure. Device 805 may be an example of or include the components of wireless device 505, wireless device 605, or an AMF as described above, e.g., with reference to FIGS. 5 and 6. Device 805 may include components for bi-directional voice and data communications including components for transmitting and receiving communications, including network entity network slice manager 815, processor 820, memory 825, software 830, transceiver 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting enabling a network-trigger change of network slices).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices. Software 830 may include code to implement aspects of the present disclosure, including code to support enabling a network-trigger change of network slices. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
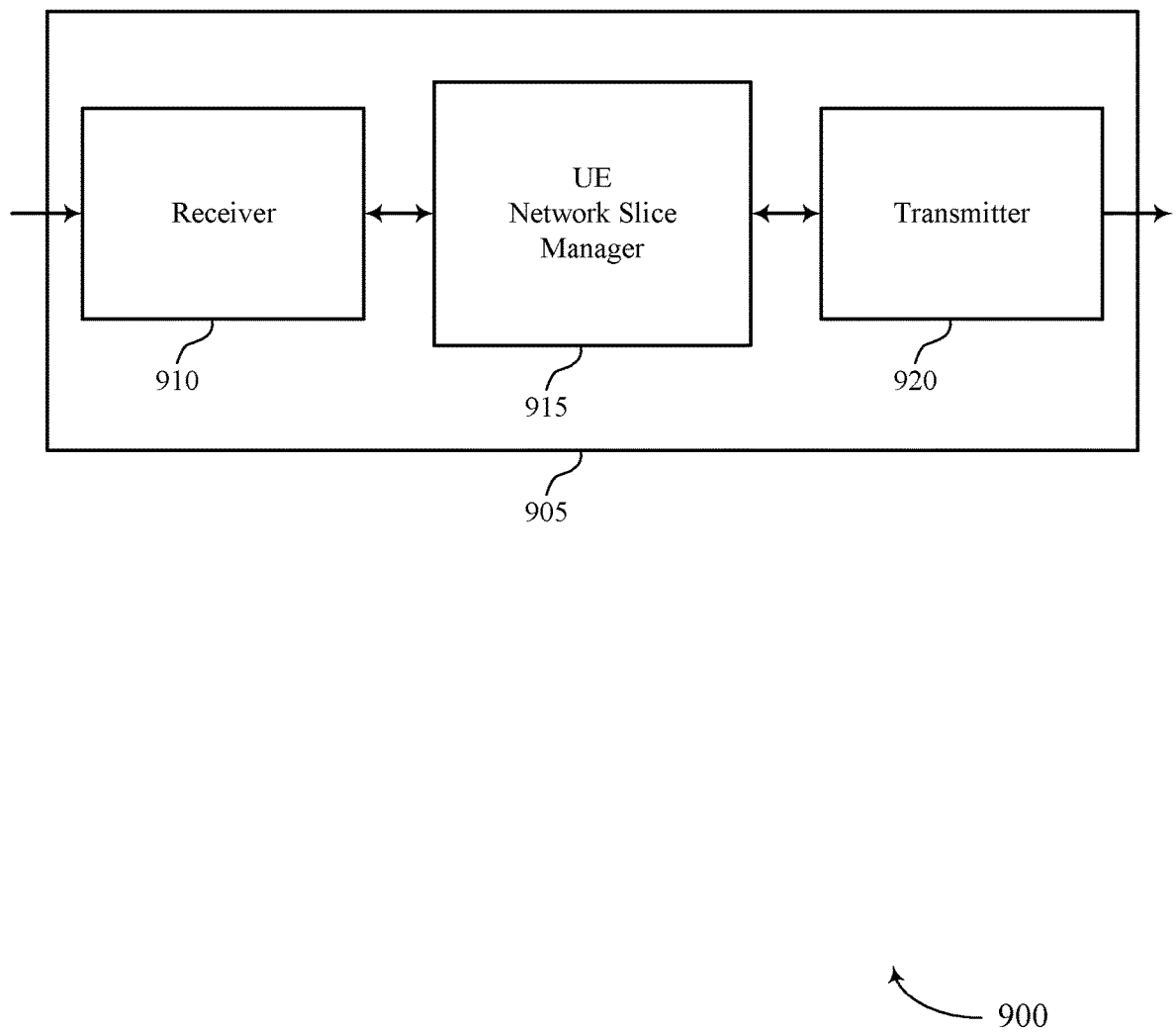
FIGS. 9 through 11 show block diagrams of a device that supports enabling a network-trigger change of network slices, in accordance with one or more aspects of the present disclosure.

FIG. 9 shows a block diagram 900 of a wireless device 905 that supports enabling a network-trigger change of network slices, in accordance with one or more aspects of the present disclosure. Wireless device 905 may be an example of aspects of a UE 115 as described herein. Wireless device 905 may include receiver 910, UE network slice manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to enabling a network-trigger change of network slices, etc.). Information may be passed on to other components of the device. The receiver 910 may be an example of aspects of the transceiver 1235 described with reference to FIG. 12. The receiver 910 may utilize a single antenna or a set of antennas. UE network slice manager 915 may be an example of aspects of the UE network slice manager 1215 described with reference to FIG. 12.

UE network slice manager 915 and/or at least some of its various sub-components may be implemented in hardware, software executed by a processor, firmware, or any combination thereof. If implemented in software executed by a processor, the functions of the UE network slice manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE network slice manager 915 and/or at least some of its various sub-components may be physically located at various positions, including being distributed such that portions of functions are implemented at different physical locations by one or more physical devices. In some examples, UE network slice manager 915 and/or at least some of its various sub-components may be a separate and distinct component in accordance with various aspects of the present disclosure. In other examples, UE network slice manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE network slice manager 915 may receive, from a source AMF, a configuration message including a NR GUTI associated with a target AMF, a status of an existing active PDU session of the UE, or new-allowed network slices, or a combination thereof, store information associated with the new-allowed network slices and NR GUTI, identify an active PDU session based on the status of existing active PDU session information included in the configuration message, the identified active PDU session is unsupported by the new-allowed network slices, and locally release the identified active PDU session. The UE network slice manager 915 may also identify a re-registration request and a code indicating a request to register a set of network slices associated with a new-allowed network slice based on a received de-registration request from a source AMF that is serving the UE, identify the new-allowed network slices based on the received de-registration request, and generate a request for registering the set of network slices based on the code.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
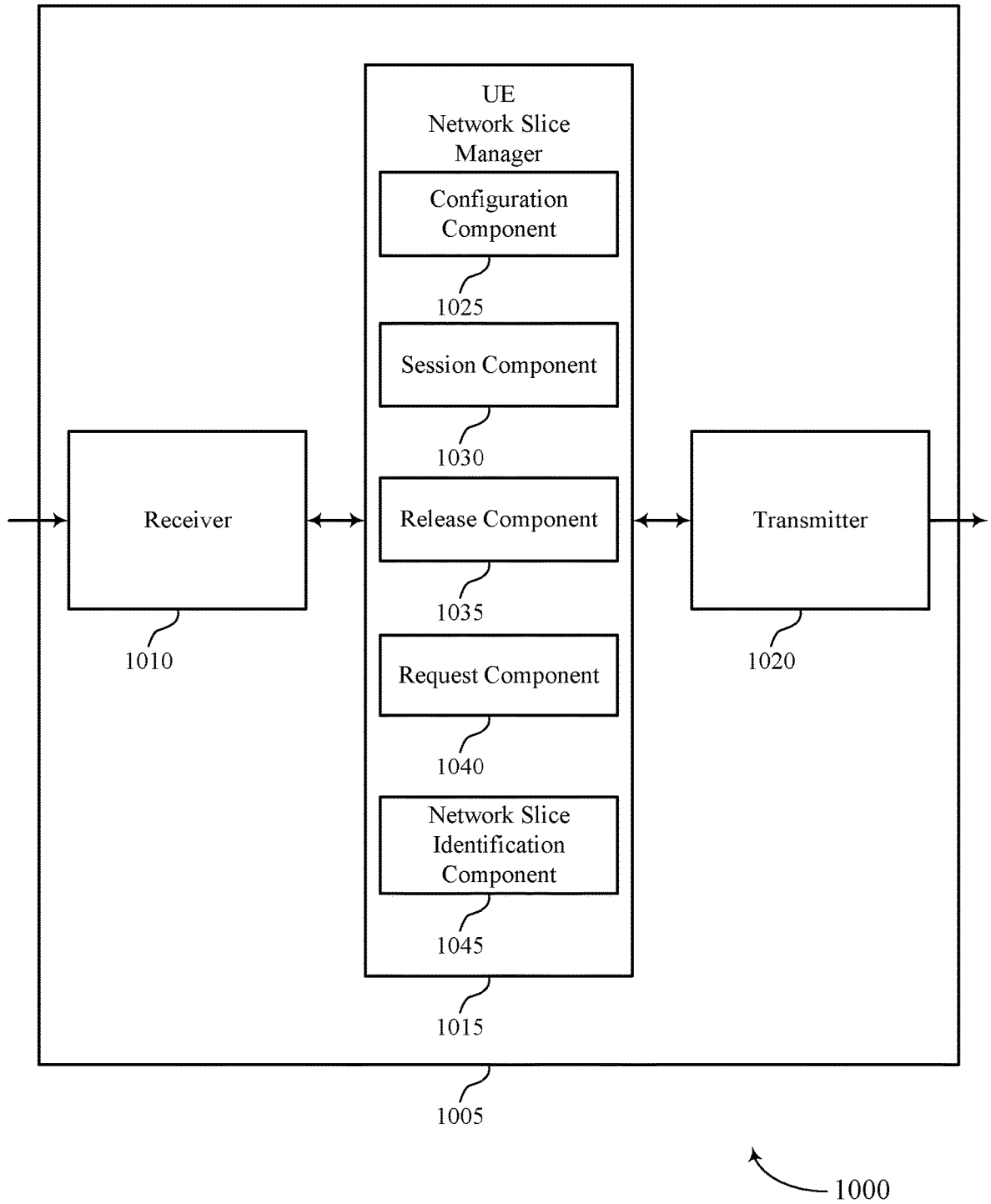

FIG. 10 shows a block diagram 1000 of a wireless device 1005 that supports enabling a network-trigger change of network slices, in accordance with one or more aspects of the present disclosure. Wireless device 1005 may be an example of aspects of a wireless device 905 or a UE 115 as described with reference to FIG. 9. Wireless device 1005 may include receiver 1010, UE network slice manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to enabling a network-trigger change of network slices, etc.). Information may be passed on to other components of the device. The receiver 1010 may be an example of aspects of the transceiver 1235 described with reference to FIG. 12. The receiver 1010 may utilize a single antenna or a set of antennas.

UE network slice manager 1015 may be an example of aspects of the UE network slice manager 1215 described with reference to FIG. 12. UE network slice manager 1015 may also include configuration component 1025, session component 1030, release component 1035, request component 1040, and network slice identification component 1045.

Configuration component 1025 may receive, from a source AMF, a configuration message including a NR GUTI associated with a target AMF, a status of an existing active PDU session of the UE, or new-allowed network slices, or a combination thereof and store information associated with the new-allowed network slices and NR GUTI. Session component 1030 may identify an active PDU session based on the status of existing active PDU session information included in the configuration message, the identified active PDU session is unsupported by the new-allowed network slices.

Release component 1035 may locally release the identified active PDU session. Request component 1040 may identify a re-registration request and a code indicating a request to register a set of network slices associated with a new-allowed network slice based on a received de-registration request from a source AMF that is serving the UE and generate a request for registering the set of network slices based on the code.

Network slice identification component 1045 may identify the new-allowed network slices based on the received de-registration request, store information associated with the new-allowed network slices, where the information includes NSSAI, and remove a current NR GUTI based on the code.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
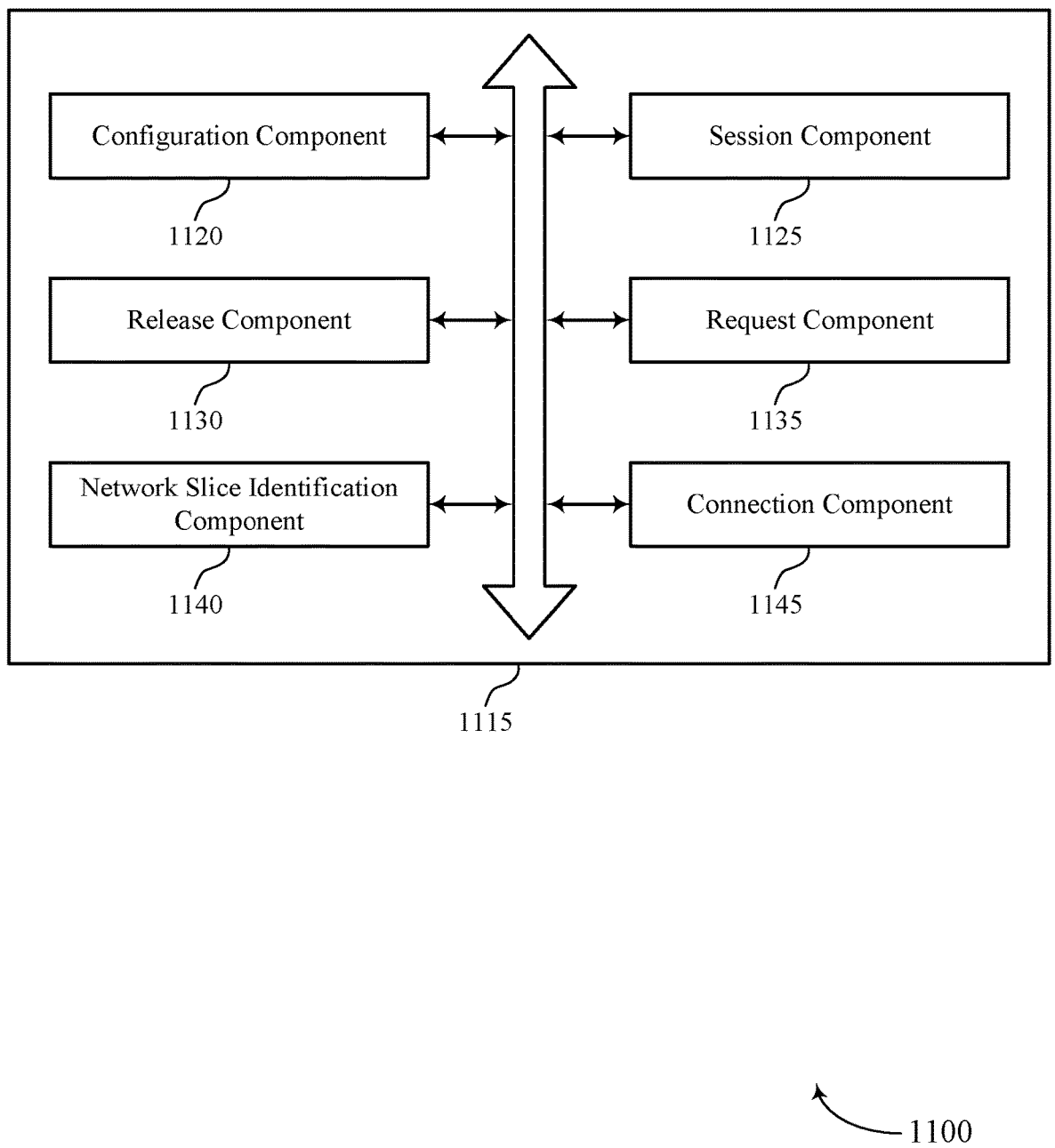

FIG. 11 shows a block diagram 1100 of a UE network slice manager 1115 that supports enabling a network-trigger change of network slices, in accordance with one or more aspects of the present disclosure. The UE network slice manager 1115 may be an example of aspects of a UE network slice manager 1215 described with reference to FIGS. 9, 10, and 12. The UE network slice manager 1115 may include configuration component 1120, session component 1125, release component 1130, request component 1135, network slice identification component 1140, and connection component 1145. Each of these modules may communicate, directly or indirectly, with one another (e.g., via one or more buses).

Configuration component 1120 may receive, from a source AMF, a configuration message including a NR GUTI associated with a target AMF, a status of an existing active PDU session of the UE, or new-allowed network slices, or a combination thereof and store information associated with the new-allowed network slices and NR GUTI. Session component 1125 may identify an active PDU session based on the status of existing active PDU session information included in the configuration message, the identified active PDU session is unsupported by the new-allowed network slices. Release component 1130 may locally release the identified active PDU session.

Request component 1135 may identify a re-registration request and a code indicating a request to register a set of network slices associated with a new-allowed network slice based on a received de-registration request from a source access and management function (AMF) that is serving the UE and generate a request for registering the set of network slices based on the code. Network slice identification component 1140 may identify the new-allowed network slices based on the received de-registration request, store information associated with the new-allowed network slices, where the information includes NSSAI, and remove a current NR GUTI based on the code.

Connection component 1145 may transmit a request to re-establish the connection based on the indication to re-establish the connection, where the request includes the NSSAI request, and transmit a new RRC reconfiguration request message including a the NSSAI request, or a code indicating signaling path configuration, or a current NR GUTI, or a combination thereof. Connection component 1145 may transmit a Nwu message including the NSSAI request, or a code indicating signaling path configuration, or a current NR GUTI, or a combination thereof. In some cases, an upper layer of the UE transmits to a lower layer of the UE: an indication to release a connection with a RAN and to re-establish the connection, or the NSSAI request, or an indication to refrain from providing a NR GUTI, or a combination thereof. In some cases, the upper layer includes a NAS layer and the lower layer includes an AS layer. In some cases, the connection includes a RRC connection. In some cases, the UE performs a RRC connection release procedure or an RRC connection establishment procedure, or both based on the indication to release a connection with a RAN and to re-establish the connection. In some cases, the connection includes an (IPsec) tunnel connection. In some cases, the UE performs an IPsec tunnel release procedure or an IPsec tunnel establishment procedure, or both based on the indication to release a connection with a RAN and to re-establish the connection. In some cases, the Nwu message includes an IKEv2 INFORMATIONAL message, or a reconfigure signaling connection message, or both.

Figure 12:
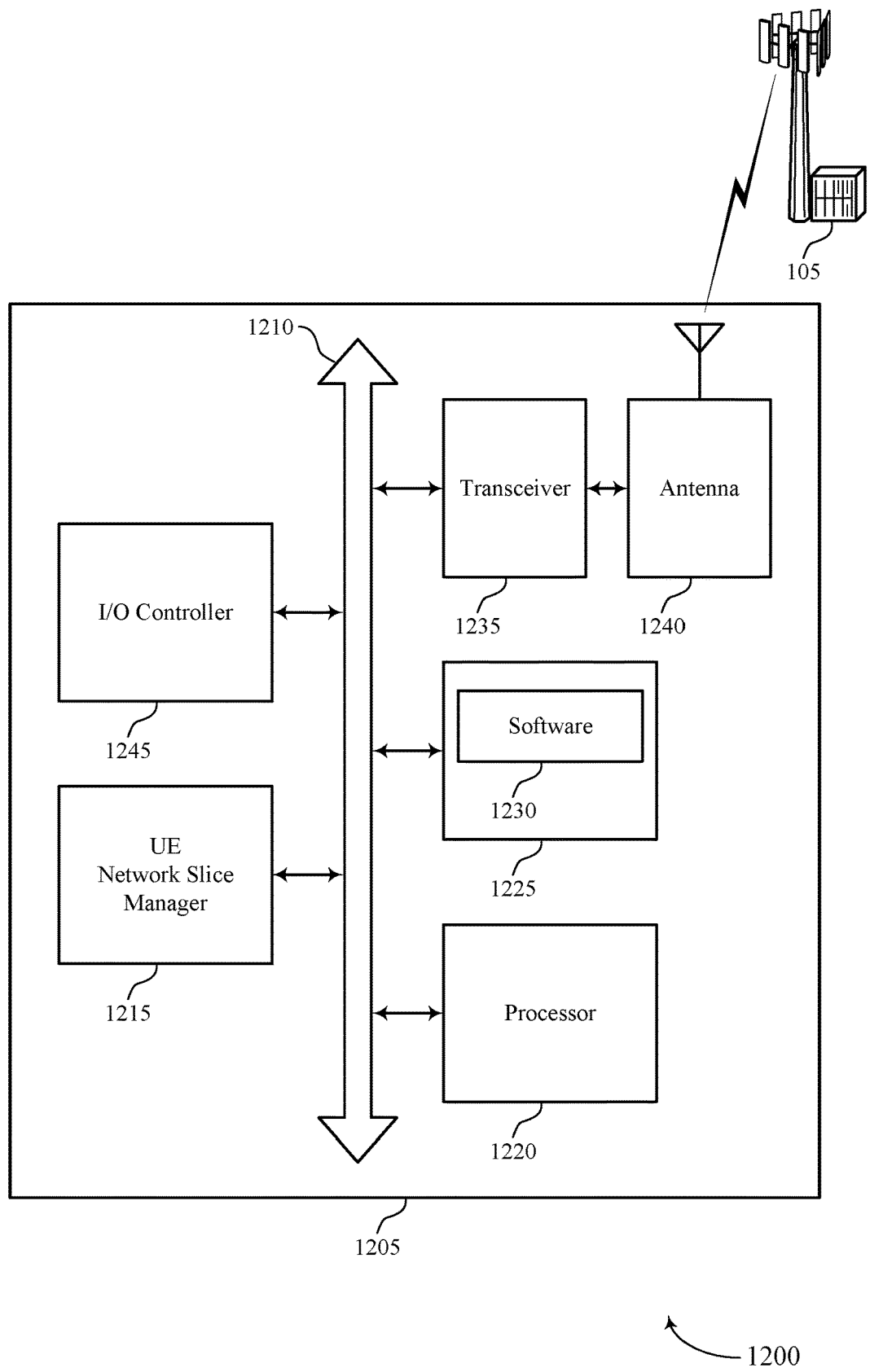
FIG. 12 illustrates a block diagram of a system including a UE that supports enabling a network-trigger change of network slices, in accordance with one or more aspects of the present disclosure.

FIG. 12 shows a diagram of a system 1200 including a device 1205 that supports enabling a network-trigger change of network slices, in accordance with one or more aspects of the present disclosure. Device 1205 may be an example of or include the components of UE 115 as described above, e.g., with reference to FIG. 1. Device 1205 may include components for bi-directional voice and data communications including components for transmitting and receiving communications, including UE network slice manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting enabling a network-trigger change of network slices).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support enabling a network-trigger change of network slices. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
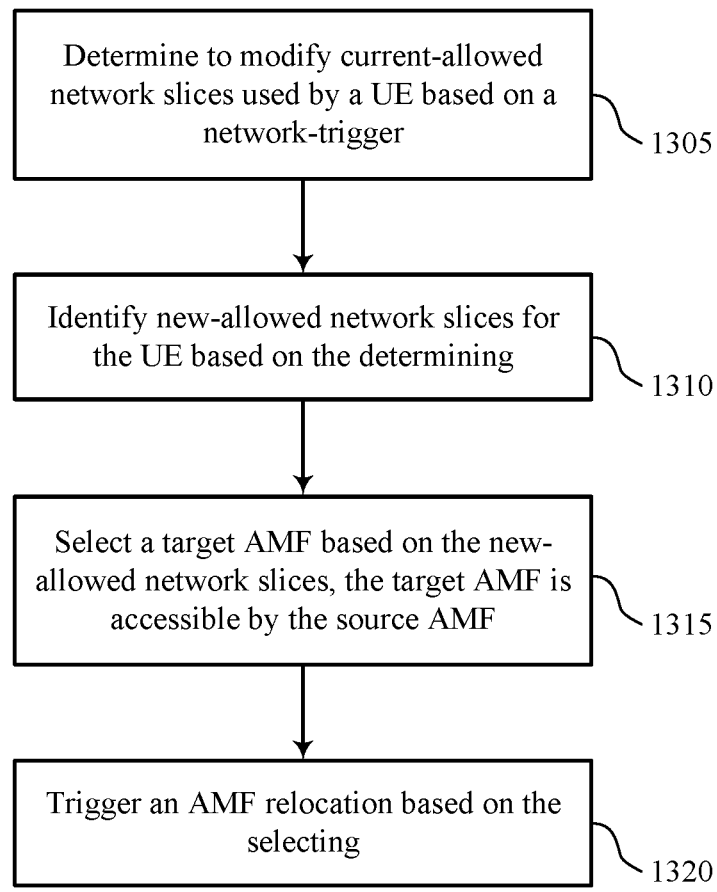
FIGS. 13 through 20 illustrate methods for enabling a network-trigger change of network slices, in accordance with one or more aspects of the present disclosure.

FIG. 13 shows a flowchart illustrating a method 1300 for enabling a network-trigger change of network slices, in accordance with one or more aspects of the present disclosure. The operations of method 1300 may be implemented by a AMF or its components as described herein. For example, the operations of method 1300 may be performed by a network entity network slice manager as described with reference to FIGS. 5 through 8. In some examples, a network entity may execute a set of codes to control the functional elements of the device to perform the functions described below. Additionally or alternatively, the network entity may perform aspects of the functions described below using special-purpose hardware.

At 1305 the network entity may determine to modify current-allowed network slices used by a UE based on a network-trigger. The operations of 1305 may be performed according to the methods described herein. In certain examples, aspects of the operations of 1305 may be performed by a network slice modification component as described with reference to FIGS. 5 through 8.

At 1310 the network entity may identify new-allowed network slices for the UE based on the determining. The operations of 1310 may be performed according to the methods described herein. In certain examples, aspects of the operations of 1310 may be performed by a network slice identification component as described with reference to FIGS. 5 through 8.

At 1315 the network entity may select a target AMF based on the new-allowed network slices, the target AMF is accessible by the source AMF. The operations of 1315 may be performed according to the methods described herein. In certain examples, aspects of the operations of 1315 may be performed by a AMF determination component as described with reference to FIGS. 5 through 8.

At 1320 the network entity may trigger an AMF relocation based on the selecting. The operations of 1320 may be performed according to the methods described herein. In certain examples, aspects of the operations of 1320 may be performed by a AMF relocation trigger component as described with reference to FIGS. 5 through 8.

Figure 14:
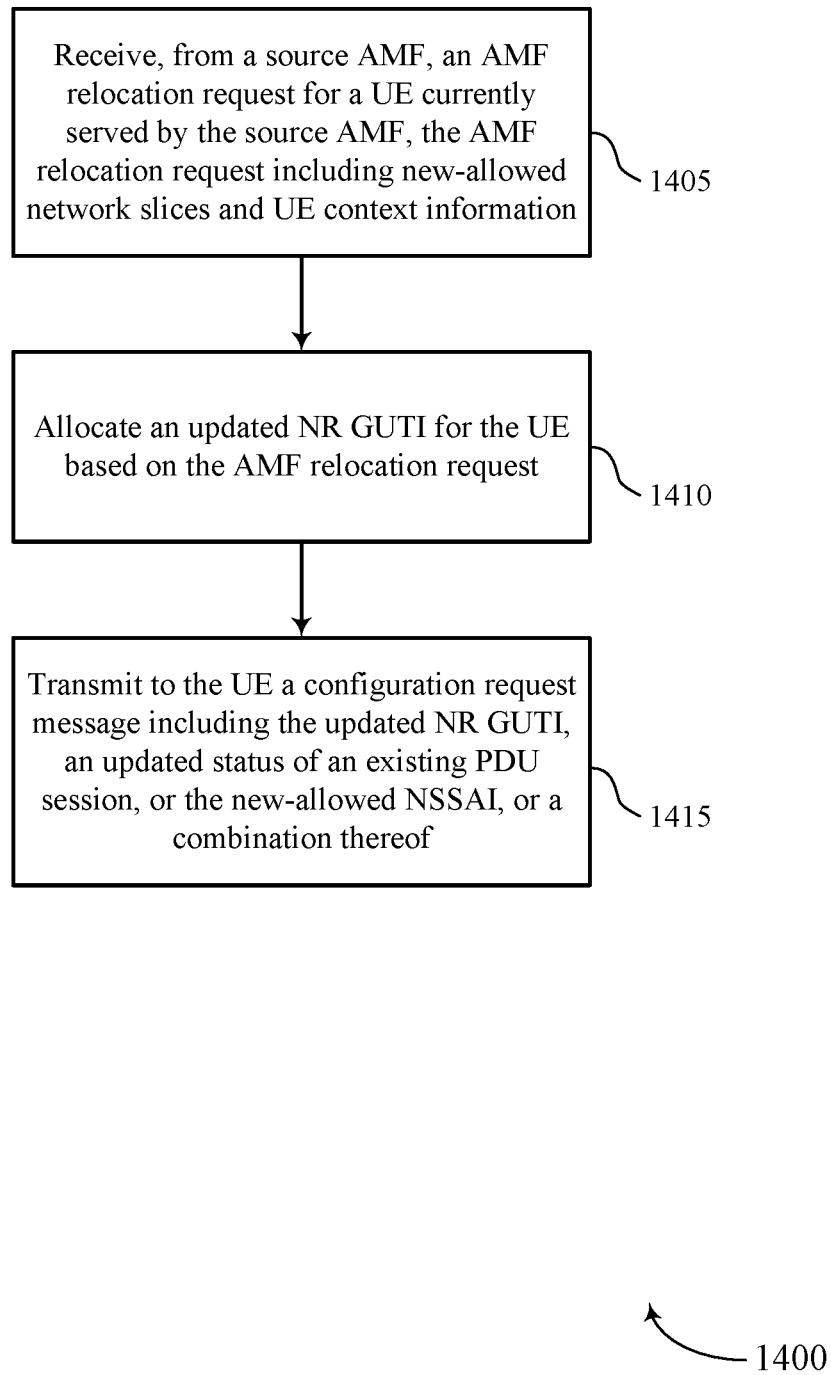

FIG. 14 shows a flowchart illustrating a method 1400 for enabling a network-trigger change of network slices, in accordance with one or more aspects of the present disclosure. The operations of method 1400 may be implemented by a network entity e.g., AMF or its components as described herein. For example, the operations of method 1400 may be performed by a network entity network slice manager as described with reference to FIGS. 5 through 8. In some examples, a network entity may execute a set of codes to control the functional elements of the device to perform the functions described below. Additionally or alternatively, the network entity may perform aspects of the functions described below using special-purpose hardware.

At 1405 the network entity may receive, from a source AMF, an AMF relocation request for a UE currently served by the source AMF, the AMF relocation request including new-allowed network slices and UE context information. The operations of 1405 may be performed according to the methods described herein. In certain examples, aspects of the operations of 1405 may be performed by a request component as described with reference to FIGS. 5 through 8.

At 1410 the network entity may allocate an updated NR GUTI for the UE based on the AMF relocation request. The operations of 1410 may be performed according to the methods described herein. In certain examples, aspects of the operations of 1410 may be performed by an allocation component as described with reference to FIGS. 5 through 8.

At 1415 the network entity may transmit to the UE a configuration request message including the updated NR GUTI, an updated status of an existing PDU session, or the new-allowed NSSAI, or a combination thereof. The operations of 1415 may be performed according to the methods described herein. In certain examples, aspects of the operations of 1415 may be performed by a request component as described with reference to FIGS. 5 through 8.

Figure 15:
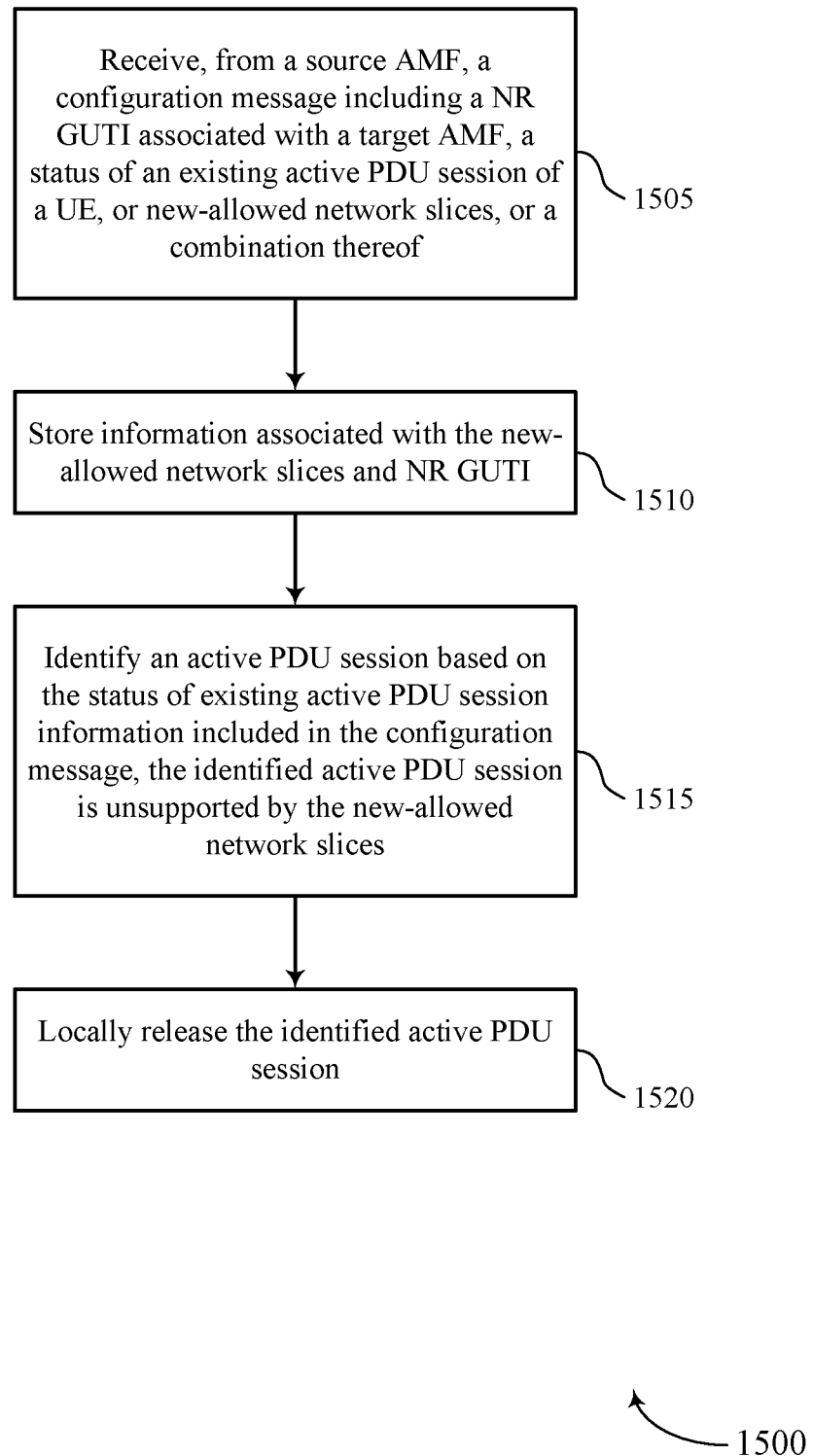

FIG. 15 shows a flowchart illustrating a method 1500 for enabling a network-trigger change of network slices, in accordance with one or more aspects of the present disclosure. The operations of method 1500 may be implemented by a UE 115 or its components as described herein. For example, the operations of method 1500 may be performed by a UE network slice manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a source AMF, a configuration message including a NR GUTI associated with a target AMF, a status of an existing active PDU session of the UE 115, or new-allowed network slices, or a combination thereof. The operations of 1505 may be performed according to the methods described herein. In certain examples, aspects of the operations of 1505 may be performed by a configuration component as described with reference to FIGS. 9 through 12.

At 1510 the UE 115 may store information associated with the new-allowed network slices and NR GUTI. The operations of 1510 may be performed according to the methods described herein. In certain examples, aspects of the operations of 1510 may be performed by a configuration component as described with reference to FIGS. 9 through 12.

At 1515 the UE 115 may identify an active PDU session based on the status of existing active PDU session information included in the configuration message, the identified active PDU session is unsupported by the new-allowed network slices. The operations of 1515 may be performed according to the methods described herein. In certain examples, aspects of the operations of 1515 may be performed by a session component as described with reference to FIGS. 9 through 12.

At 1520 the UE 115 may locally release the identified active PDU session. The operations of 1520 may be performed according to the methods described herein. In certain examples, aspects of the operations of 1520 may be performed by a release component as described with reference to FIGS. 9 through 12.

Figure 16:
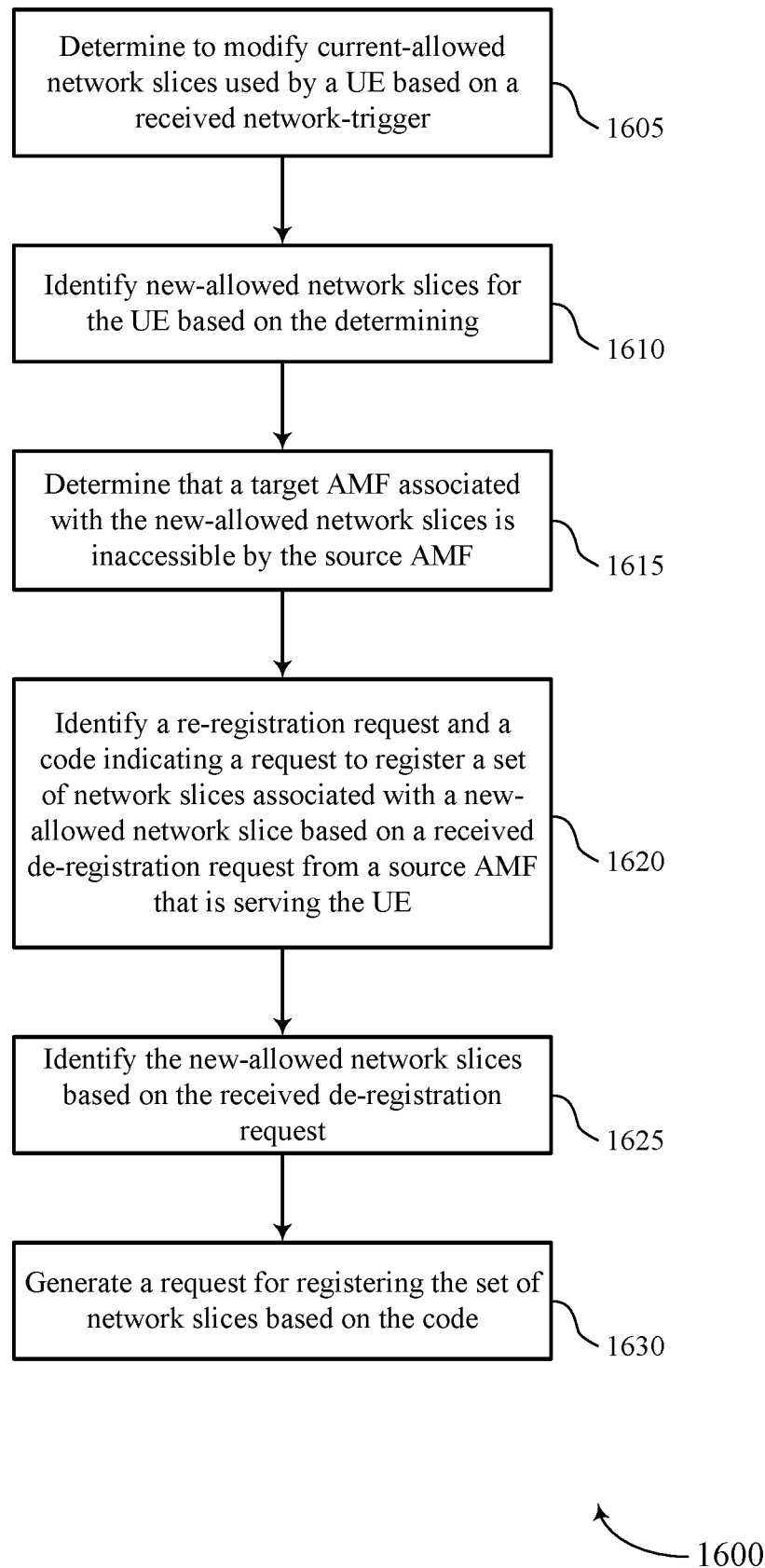

FIG. 16 shows a flowchart illustrating a method 1600 for enabling a network-trigger change of network slices, in accordance with one or more aspects of the present disclosure. The operations of method 1600 may be implemented by a network entity e.g., AMF or its components as described herein. For example, the operations of method 1600 may be performed by a network entity network slice manager as described with reference to FIGS. 5 through 8. In some examples, a network entity may execute a set of codes to control the functional elements of the device to perform the functions described below. Additionally or alternatively, the network entity may perform aspects of the functions described below using special-purpose hardware.

At 1605 the network entity may determine to modify current-allowed network slice used by a UE based on a received network-trigger. The operations of 1605 may be performed according to the methods described herein. In certain examples, aspects of the operations of 1605 may be performed by a network slice modification component as described with reference to FIGS. 5 through 8.

At 1610 the network entity may identify new-allowed network slices for the UE based on the determining. The operations of 1610 may be performed according to the methods described herein. In certain examples, aspects of the operations of 1610 may be performed by a network slice identification component as described with reference to FIGS. 5 through 8.

At 1615 the network entity may determine that a target AMF associated with the new-allowed network slices is inaccessible by the source AMF. The operations of 1615 may be performed according to the methods described herein. In certain examples, aspects of the operations of 1615 may be performed by a AMF determination component as described with reference to FIGS. 5 through 8.

At 1620 the network entity may identify a re-registration request and a code indicating a request to register a set of network slices associated with a new-allowed network slice based on a received de-registration request from a source AMF that is serving the UE. The operations of 1620 may be performed according to the methods described herein. In certain examples, aspects of the operations of 1620 may be performed by a request component as described with reference to FIGS. 5 through 8.

At 1625 the network entity may identify the new-allowed network slices based on the received de-registration request. The operations of 1625 may be performed according to the methods described herein. In certain examples, aspects of the operations of 1625 may be performed by a network slice identification component as described with reference to FIGS. 5 through 8.

At 1630 the network entity may generate a request for registering the set of network slices based on the code. The operations of 1630 may be performed according to the methods described herein. In certain examples, aspects of the operations of 1630 may be performed by a request component as described with reference to FIGS. 5 through 8.

Figure 17:
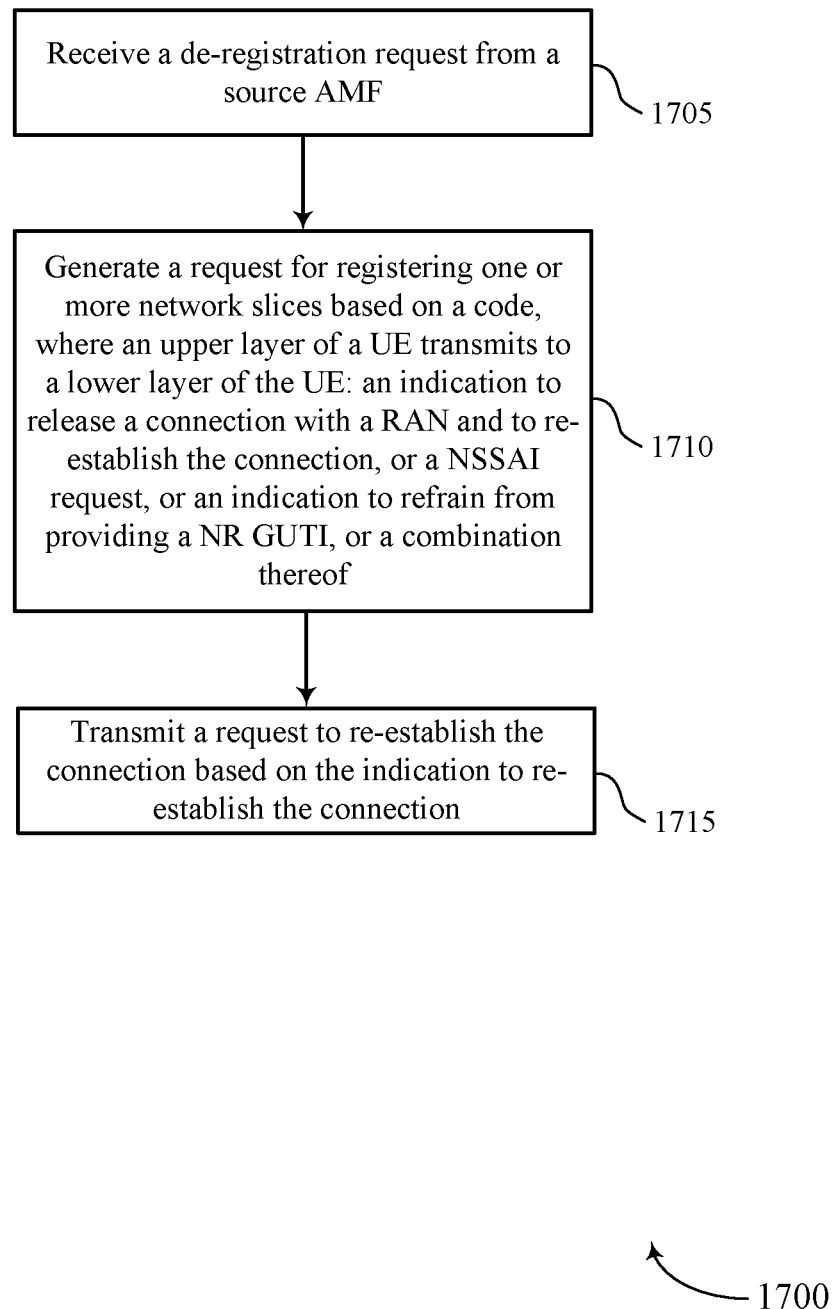

FIG. 17 shows a flowchart illustrating a method 1700 for enabling a network-trigger change of network slices, in accordance with one or more aspects of the present disclosure. The operations of method 1700 may be implemented by a UE 115 or its components as described herein. For example, the operations of method 1700 may be performed by a UE network slice manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive a de-registration request from a source AMF. In some cases, UE 115 may identify a re-registration request and a code indicating a request to register one or more new network slices associated with a new-allowed network slice based on the received de-registration request from the source AMF serving the UE 115. The operations of 1705 may be performed according to the methods described herein. In certain examples, aspects of the operations of 1705 may be performed by a request component as described with reference to FIGS. 9 through 12.

At 1710 the UE 115 may generate a request for registering one or more network slices based on a code (e.g., indicating a request to register one or more new network slices associated with a new-allowed network slice), where an upper layer of the UE transmits to a lower layer of the UE: an indication to release a connection with a RAN and to re-establish the connection, or a NSSAI request, or an indication to refrain from providing a NR GUTI, or a combination thereof. Additionally, in some examples, upon UE 115 receiving the de-registration request including an indication to re-register or the cause code, or both; the upper layer(s) of the UE 115 may indicate to the lower layer(s) of UE 115 to delete an existing GUTI. In addition the upper layer(s) may indicate to the lower layer(s) to transmit a registration request with the one or more new network slices. In some cases, the upper layer is NAS layer and the lower layer is an AS layer. The operations of 1710 may be performed according to the methods described herein. In certain examples, aspects of the operations of 1710 may be performed by a connection component as described with reference to FIGS. 9 through 12.

At 1715 the UE 115 may transmit a request to re-establish the connection based on the indication to re-establish the connection. In some cases, the request may include an NSSAI request. In some cases, the connection may also be a RRC connection. In this case, UE 115 may perform a RRC connection release procedure or an RRC connection establishment procedure, or both based on the indication to release a connection with a RAN and to re-establish the connection. Alternatively, the connection may be a IPsec tunnel connection. In this case, UE 115 may perform an IPsec tunnel release procedure or an IPsec tunnel establishment procedure, or both based on the indication to release a connection with a RAN and to re-establish the connection. The operations of 1715 may be performed according to the methods described herein. In certain examples, aspects of the operations of 1715 may be performed by a connection component as described with reference to FIGS. 9 through 12.

Figure 18:
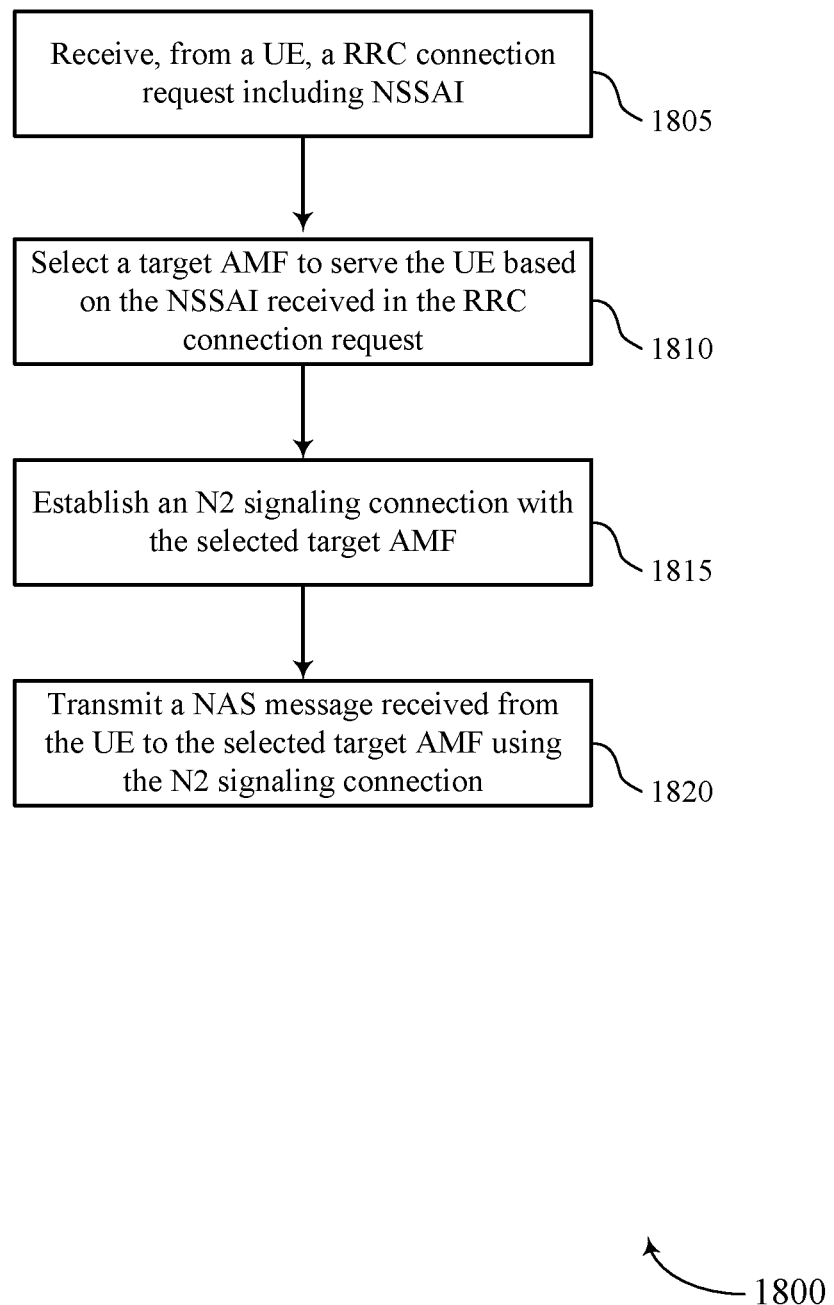

FIG. 18 shows a flowchart illustrating a method 1800 for enabling a network-trigger change of network slices, in accordance with one or more aspects of the present disclosure. The operations of method 1800 may be implemented by a network entity e.g., RAN or its components as described herein. For example, the operations of method 1800 may be performed by a network entity network slice manager as described with reference to FIGS. 5 through 8. In some examples, a network entity may execute a set of codes to control the functional elements of the device to perform the functions described below. Additionally or alternatively, the network entity may perform aspects of the functions described below using special-purpose hardware.

At 1805 the network entity may receive, from a UE a RRC connection request indicating a request to register one or more new network slices associated with a new-allowed network slice NSSAI. The operations of 1805 may be performed according to the methods described herein. In certain examples, aspects of the operations of 1805 may be performed by a request component as described with reference to FIGS. 5 through 8.

At 1810 the network entity may select a target AMF to serve the UE based on the NSSAI received in the RRC connection request. The operations of 1810 may be performed according to the methods described herein. In certain examples, aspects of the operations of 1810 may be performed by a AMF determination component as described with reference to FIGS. 5 through 8.

At 1815 the network entity may establish an N2 signaling connection with the selected AMF. The operations of 1815 may be performed according to the methods described herein. In certain examples, aspects of the operations of 1815 may be performed by a connection component as described with reference to FIGS. 5 through 8.

At 1820 the network entity may transmit a NAS message received from the UE to the selected AMF using the N2 signaling connection. The operations of 1820 may be performed according to the methods described herein. In certain examples, aspects of the operations of 1820 may be performed by a connection component as described with reference to FIGS. 5 through 8.

Figure 19:
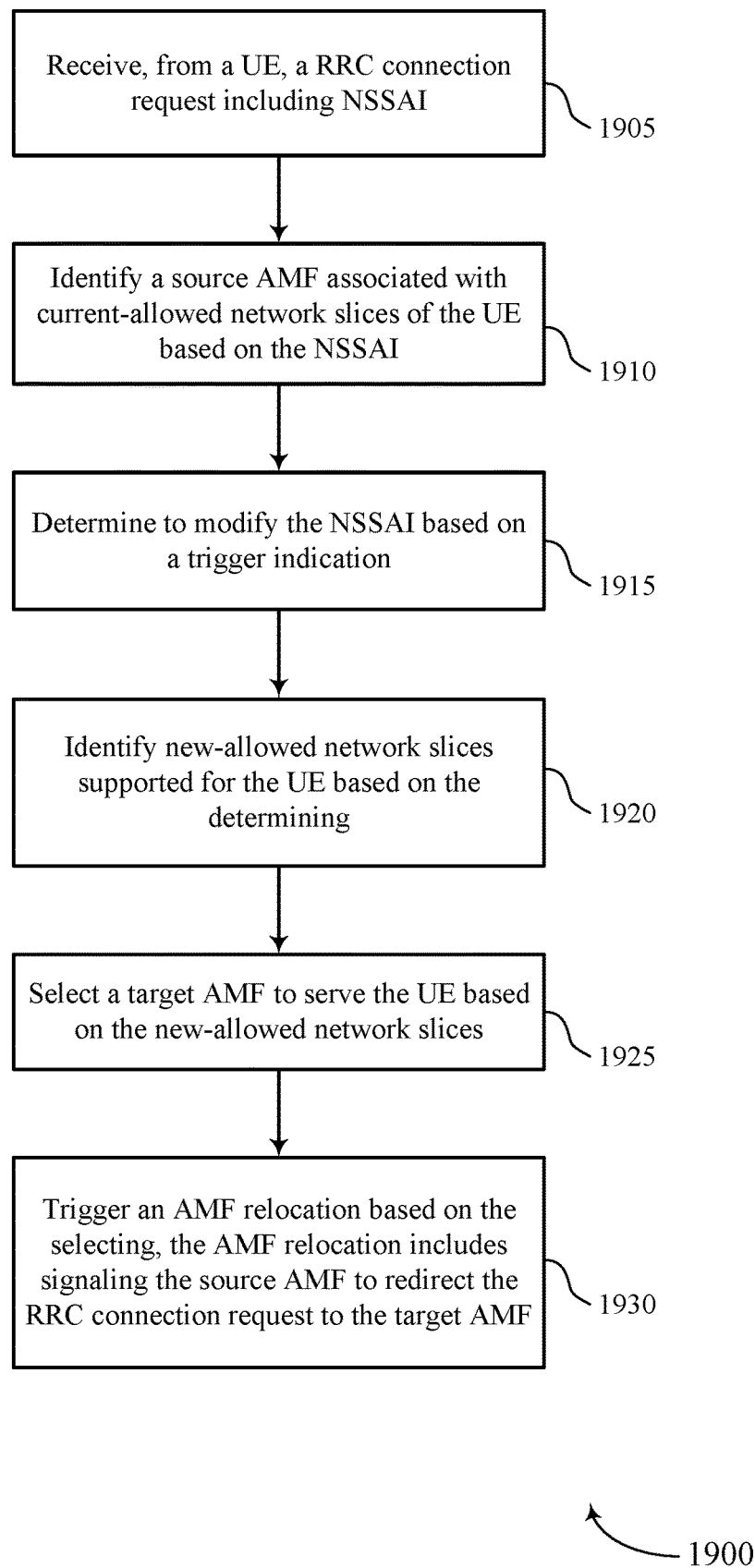

FIG. 19 shows a flowchart illustrating a method 1900 for enabling a network-trigger change of network slices, in accordance with one or more aspects of the present disclosure. The operations of method 1900 may be implemented by a network entity e.g., RAN or its components as described herein. In some examples, a network entity may execute a set of codes to control the functional elements of the device to perform the functions described below. Additionally or alternatively, the network entity may perform aspects of the functions described below using special-purpose hardware.

At 1905 the network entity may receive, from a UE, a RRC connection request including NSSAI. The operations of 1905 may be performed according to the methods described herein. In certain examples, the network entity may perform aspects of the functions described below using special-purpose hardware.

At 1910 the network entity may identify a source AMF associated current-allowed network slices of the UE based on the NSSAI. The operations of 1910 may be performed according to the methods described herein. In certain examples, the network entity may perform aspects of the functions described below using special-purpose hardware.

At 1915 the network entity may determine to modify the NSSAI based on a trigger indication. The operations of 1915 may be performed according to the methods described herein. In certain examples, the network entity may perform aspects of the functions described below using special-purpose hardware.

At 1920 the network entity may identify new-allowed network slices supported for the UE based on the determining. The operations of 1920 may be performed according to the methods described herein. In certain examples, the network entity may perform aspects of the functions described below using special-purpose hardware.

At 1925 the network entity may select a target AMF to serve the UE based on the new-allowed network slices. The operations of 1925 may be performed according to the methods described herein. In certain examples, the network entity may perform aspects of the functions described below using special-purpose hardware.

At 1930 the network entity may trigger an AMF relocation based on the selecting, the AMF relocation includes signaling the source AMF to redirect the RRC connection request to the target AMF. The operations of 1925 may be performed according to the methods described herein. In certain examples, the network entity may perform aspects of the functions described below using special-purpose hardware.

Figure 20:
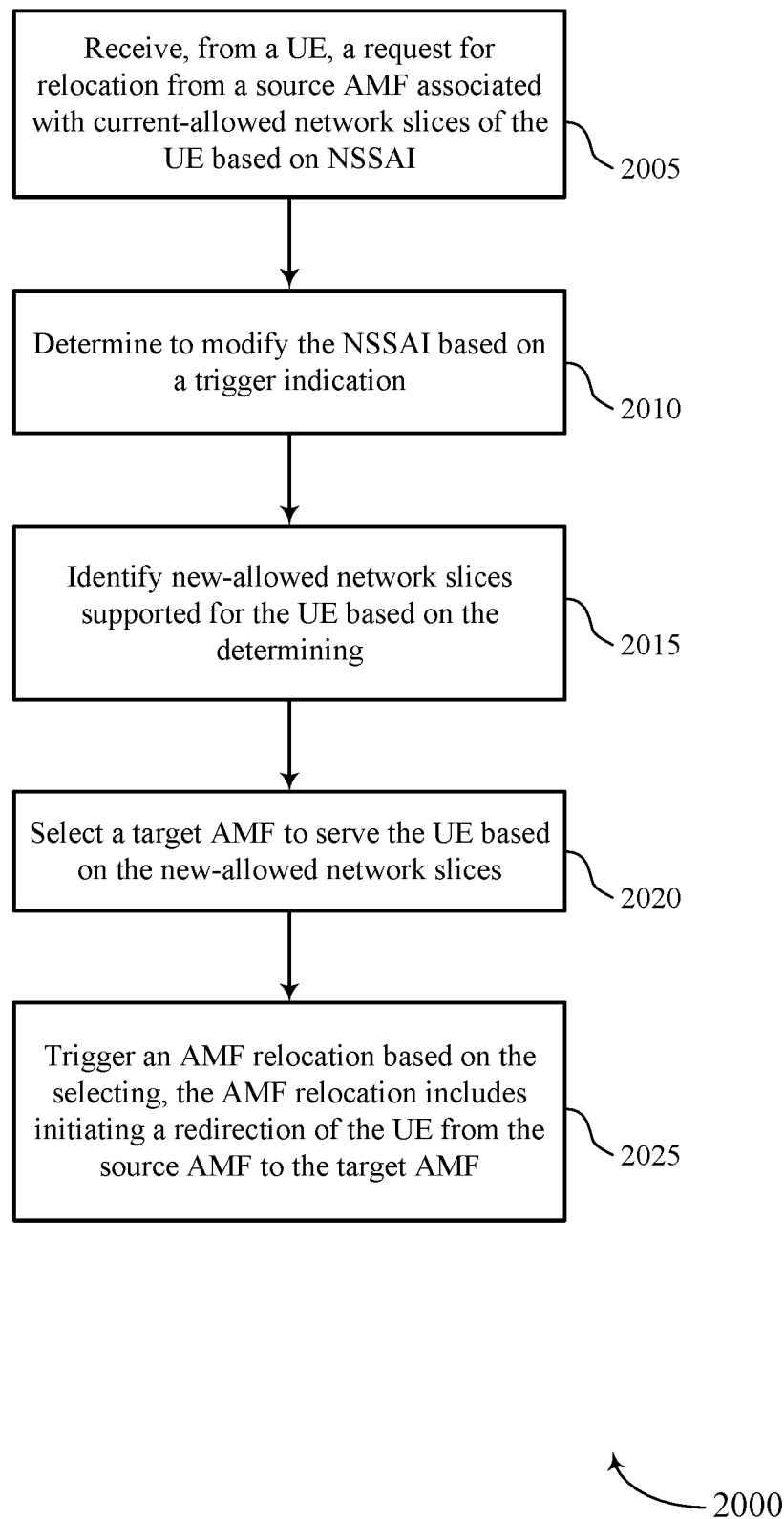

FIG. 20 shows a flowchart illustrating a method 2000 for enabling a network-trigger change of network slices, in accordance with one or more aspects of the present disclosure. The operations of method 2000 may be implemented by a network entity e.g., RAN or its components as described herein. In some examples, a network entity may execute a set of codes to control the functional elements of the device to perform the functions described below. Additionally or alternatively, the network entity may perform aspects of the functions described below using special-purpose hardware.

At 2005 the network entity may receive, from a UE, a request for relocation from a source AMF associated with current-allowed network slices of the UE based on NSSAI. The operations of 2005 may be performed according to the methods described herein. In certain examples, the network entity may perform aspects of the functions described below using special-purpose hardware.

At 2010 the network entity may determine to modify the NSSAI based on a trigger indication. The operations of 2010 may be performed according to the methods described herein. In certain examples, the network entity may perform aspects of the functions described below using special-purpose hardware.

At 2015 the network entity may identify new-allowed network slices supported for the UE based on the determining. The operations of 2015 may be performed according to the methods described herein. In certain examples, the network entity may perform aspects of the functions described below using special-purpose hardware.

At 2020 the network entity may select a target AMF to serve the UE based on the new-allowed network slices. The operations of 2020 may be performed according to the methods described herein. In certain examples, the network entity may perform aspects of the functions described below using special-purpose hardware.

At 2025 the network entity may trigger an AMF relocation based on the selecting, the AMF relocation includes initiating a redirection of the UE from the source AMF to the target AMF. The operations of 2025 may be performed according to the methods described herein. In certain examples, the network entity may perform aspects of the functions described below using special-purpose hardware.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary block that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, via messages from a source access and mobility management function (AMF) and a target access and mobility management function (AMF), an indication to initiate a registration procedure, an identifier associated with the target AMF, one or more statuses of one or more protocol data unit (PDU) sessions, and an indication of one or more new allowed network slices;
    initiating a registration procedure based at least in part on the receiving;
    identifying a first protocol data unit (PDU) session based at least in part on the receiving, the first PDU session unsupported by the one or more new allowed network slices; and
    locally releasing the first PDU session based at least in part on the identifying.

2. The method of claim 1, wherein the identifier associated with the target AMF comprises a new radio (NR) globally unique temporary identifier (GUTI).

3. The method of claim 1, wherein the one or more statuses of the one or more PDU sessions indicate that the first PDU session is unsupported by the one or more new allowed network slices.

4. A method for wireless communication at a user equipment (UE), comprising:
    receiving, via a first message from a source access and mobility management function (AMF), an indication to initiate a registration procedure, an identifier associated with an AMF, and an indication of one or more new allowed network slices;
    initiating a registration procedure based at least in part on the receiving via the first message;

receiving, via a second message from a target access and mobility management function (AMF), one or more statuses of one or more protocol data unit (PDU) sessions;
identifying a first protocol data unit (PDU) session based at least in part on the receiving via the second message, the first PDU session unsupported by the one or more new allowed network slices; and
locally releasing the first PDU session based at least in part on the identifying.

5. The method of claim 4, wherein the identifier associated with the AMF comprises a new radio (NR) globally unique temporary identifier (GUTI).

6. The method of claim 4, wherein the one or more statuses of the one or more PDU sessions indicate that the first PDU session is unsupported by the one or more new allowed network slices.

7. An apparatus for wireless communication, comprising:
a processor,
memory coupled with the processor; and
instructions stored in the memory and executable by the processor to cause the apparatus to:
receive, via messages from a source access and mobility management function (AMF) and a target access and mobility management function (AMF), an indication to initiate a registration procedure, an identifier associated with the target AMF, one or more statuses of one or more protocol data unit (PDU) sessions, and an indication of one or more new allowed network slices;
initiate a registration procedure based at least in part on the receiving;
identify a first protocol data unit (PDU) session based at least in part on the receiving, the first PDU session unsupported by the one or more new allowed network slices; and
locally release the first PDU session based at least in part on the identifying.

8. The apparatus of claim 7, wherein the identifier associated with the target AMF comprises a new radio (NR) globally unique temporary identifier (GUTI).

9. The apparatus of claim 7, wherein the one or more statuses of the one or more PDU sessions indicate that the first PDU session is unsupported by the one or more new allowed network slices.

10. An apparatus for wireless communication, comprising:
a processor,
memory coupled with the processor; and
instructions stored in the memory and executable by the processor to cause the apparatus to:
receive, via a first message from a source access and mobility management function (AMF), an indication to initiate a registration procedure, an identifier associated with an AMF, and an indication of one or more new allowed network slices;
initiate a registration procedure based at least in part on the receiving via the first message;
receive, via a second message from a target access and mobility management function (AMF), one or more statuses of one or more protocol data unit (PDU) sessions;
identify a first protocol data unit (PDU) session based at least in part on the receiving via the second message, the first PDU session unsupported by the one or more new allowed network slices; and
locally release the first PDU session based at least in part on the identifying.

11. The apparatus of claim 10, wherein the identifier associated with the AMF comprises a new radio (NR) globally unique temporary identifier (GUTI).

12. The apparatus of claim 10, wherein the one or more statuses of the one or more PDU sessions indicate that the first PDU session is unsupported by the one or more new allowed network slices.

13. An apparatus for wireless communication, comprising:
means for receiving, via messages from a source access and mobility management function (AMF) and a target access and mobility management function (AMF), an indication to initiate a registration procedure, an identifier associated with the target AMF, one or more statuses of one or more protocol data unit (PDU) sessions, and an indication of one or more new allowed network slices;
means for initiating a registration procedure based at least in part on the receiving;
means for identifying a first protocol data unit (PDU) session based at least in part on the receiving, the first PDU session unsupported by the one or more new allowed network slices; and
means for locally releasing the first PDU session based at least in part on the identifying.

14. The apparatus of claim 13, wherein the identifier associated with the target AMF comprises a new radio (NR) globally unique temporary identifier (GUTI).

15. The apparatus of claim 13, wherein the one or more statuses of the one or more PDU sessions indicate that the first PDU session is unsupported by the one or more new allowed network slices.

16. An apparatus for wireless communication, comprising:
means for receiving, via a first message from a source access and mobility management function (AMF), an indication to initiate a registration procedure, an identifier associated with an AMF, and an indication of one or more new allowed network slices;
means for initiating a registration procedure based at least in part on the receiving via the first message;
means for receiving, via a second message from a target access and mobility management function (AMF), one or more statuses of one or more protocol data unit (PDU) sessions;
means for identifying a first protocol data unit (PDU) session based at least in part on the receiving via the second message, the first PDU session unsupported by the one or more new allowed network slices; and
means for locally releasing the first PDU session based at least in part on the identifying.

17. The apparatus of claim 16, wherein the identifier associated with the AMF comprises a new radio (NR) globally unique temporary identifier (GUTI).

18. The apparatus of claim 16, wherein the one or more statuses of the one or more PDU sessions indicate that the first PDU session is unsupported by the one or more new allowed network slices.

19. A non-transitory computer-readable medium storing code for wireless communication at a user equipment (UE), the code comprising instructions executable by a processor to:
receive, via messages from a source access and mobility management function (AMF) and a target access and mobility management function (AMF), an indication to initiate a registration procedure, an identifier associated with the target AMF, one or more statuses of one or more protocol data unit (PDU) sessions, and an indication of one or more new allowed network slices;

initiate a registration procedure based at least in part on the receiving;

identify a first protocol data unit (PDU) session based at least in part on the receiving, the first PDU session unsupported by the one or more new allowed network slices; and locally release the first PDU session based at least in part on the identifying.

20. The non-transitory computer-readable medium of claim 19, wherein the identifier associated with the target AMF comprises a new radio (NR) globally unique temporary identifier (GUTI).

21. The non-transitory computer-readable medium of claim 19, wherein the one or more statuses of the one or more PDU sessions indicate that the first PDU session is unsupported by the one or more new allowed network slices.

22. A non-transitory computer-readable medium storing code for wireless communication at a user equipment (UE), the code comprising instructions executable by a processor to:

receive, via a first message from a source access and mobility management function (AMF), an indication to initiate a registration procedure, an identifier associated with an AMF, and an indication of one or more new allowed network slices;

initiate a registration procedure based at least in part on the receiving via the first message;

receive, via a second message from a target access and mobility management function (AMF), one or more statuses of one or more protocol data unit (PDU) sessions;

identify a first protocol data unit (PDU) session based at least in part on the receiving via the second message, the first PDU session unsupported by the one or more new allowed network slices; and locally release the first PDU session based at least in part on the identifying.

23. The non-transitory computer-readable medium of claim 22, wherein the identifier associated with the AMF comprises a new radio (NR) globally unique temporary identifier (GUTI).

24. The non-transitory computer-readable medium of claim 22, wherein the one or more statuses of the one or more PDU sessions indicate that the first PDU session is unsupported by the one or more new allowed network slices.

25. A method for wireless communication at a user equipment (UE), comprising:

receiving, via a first message from a source access and mobility management function (AMF), an indication to initiate a registration procedure and an indication of one or more new allowed network slices;

initiating a registration procedure based at least in part on the receiving via the first message;

receiving, via a second message from a target access and mobility management function (AMF), one or more statuses of one or more protocol data unit (PDU) sessions;

identifying a first protocol data unit (PDU) session based at least in part on the receiving via the second message, the first PDU session unsupported by the one or more new allowed network slices; and locally releasing the first PDU session based at least in part on the identifying.

26. The method of claim 25, wherein the one or more statuses of the one or more PDU sessions indicate that the first PDU session is unsupported by the one or more new allowed network slices.

27. An apparatus for wireless communication, comprising:

a processor, memory coupled with the processor; and instructions stored in the memory and executable by the processor to cause the apparatus to:

receive, via a first message from a source access and mobility management function (AMF), an indication to initiate a registration procedure and an indication of one or more new allowed network slices;

initiate a registration procedure based at least in part on the receiving via the first message;

receive, via a second message from a target access and mobility management function (AMF), one or more statuses of one or more protocol data unit (PDU) sessions;

identify a first protocol data unit (PDU) session based at least in part on the receiving via the second message, the first PDU session unsupported by the one or more new allowed network slices; and locally release the first PDU session based at least in part on the identifying.

28. The apparatus of claim 27, wherein the one or more statuses of the one or more PDU sessions indicate that the first PDU session is unsupported by the one or more new allowed network slices.

29. An apparatus for wireless communication, comprising:

means for receiving, via a first message from a source access and mobility management function (AMF), an indication to initiate a registration procedure and an indication of one or more new allowed network slices;

means for initiating a registration procedure based at least in part on the receiving via the first message;

means for receiving, via a second message from a target access and mobility management function (AMF), one or more statuses of one or more protocol data unit (PDU) sessions;

means for identifying a first protocol data unit (PDU) session based at least in part on the receiving via the second message, the first PDU session unsupported by the one or more new allowed network slices; and means for locally releasing the first PDU session based at least in part on the identifying.

30. The apparatus of claim 29, wherein the one or more statuses of the one or more PDU sessions indicate that the first PDU session is unsupported by the one or more new allowed network slices.

31. A non-transitory computer-readable medium storing code for wireless communication at a user equipment (UE), the code comprising instructions executable by a processor to:

receive, via a first message from a source access and mobility management function (AMF), an indication to initiate a registration procedure and an indication of one or more new allowed network slices;

initiate a registration procedure based at least in part on the receiving via the first message;

receive, via a second message from a target access and mobility management function (AMF), one or more statuses of one or more protocol data unit (PDU) sessions;

identify a first protocol data unit (PDU) session based at least in part on the receiving via the second message, the first PDU session unsupported by the one or more new allowed network slices; and locally release the first PDU session based at least in part on the identifying.

32. The non-transitory computer-readable medium of claim 31, wherein the one or more statuses of the one or more PDU sessions indicate that the first PDU session is unsupported by the one or more new allowed network slices.

\* \* \* \* \*